United States Patent
Stein et al.

(10) Patent No.: US 7,457,198 B2
(45) Date of Patent: Nov. 25, 2008

(54) SWIMMER DETECTION SONAR NETWORK

(75) Inventors: Peter Jonathan Stein, Hollis, NH (US);
Amy Vandiver, Bedford, NH (US);
Michael Richard Birmann, Arlington, MA (US); John Timothy Wood, Nashua, NH (US); Joseph Steven Johnson, Clifton, VA (US)

(73) Assignees: Scientific Solutions, Inc., Nashua, NH (US); The United States of America as represented by the Secretary of the Navy, Washington, DC (US)

( * ) Notice: Subject to any disclaimer, the term of this patent is extended or adjusted under 35 U.S.C. 154(b) by 91 days.

(21) Appl. No.: 11/396,080

(22) Filed: Mar. 31, 2006

(65) Prior Publication Data

US 2007/0230276 A1    Oct. 4, 2007

(51) Int. Cl.
*G01S 15/00* (2006.01)
*B06B 1/06* (2006.01)

(52) U.S. Cl. .......................... 367/151; 367/87
(58) Field of Classification Search ............ 367/87, 367/151, 93, 131
See application file for complete search history.

(56) References Cited

U.S. PATENT DOCUMENTS

| | | | | |
|---|---|---|---|---|
| 5,138,587 A | * | 8/1992 | Mason | 367/136 |
| 5,398,217 A | | 3/1995 | Cannelli et al. | 367/147 |
| 2004/0100868 A1 | * | 5/2004 | Patterson et al. | 367/127 |
| 2004/0141419 A1 | * | 7/2004 | Hicks et al. | 367/131 |
| 2005/0007880 A1 | * | 1/2005 | Zimmerman et al. | 367/103 |
| 2006/0018198 A1 | * | 1/2006 | McDonald et al. | 367/87 |

FOREIGN PATENT DOCUMENTS

| | | |
|---|---|---|
| WO | WO86/02739 | 5/1986 |
| WO | WO2004/046757 | 6/2004 |

OTHER PUBLICATIONS

Declaration under 37 CFR 1.132 accompanying document entitled "A Joint U.S.—Singapore System Development, Test Results from NB2," presentation given Oct. 7, 2005 attached to slides shown at presentation.

* cited by examiner

*Primary Examiner*—Dan Pihulic
(74) *Attorney, Agent, or Firm*—Burns & Levinson LLP; Jacob N. Erlich; Thomas P. Grodt

(57) ABSTRACT

A method for detecting an object in a body of water by generating a plurality of signals and applying each signal to a separate submerged sonar node that is a part of an array of sonar nodes.

39 Claims, 23 Drawing Sheets

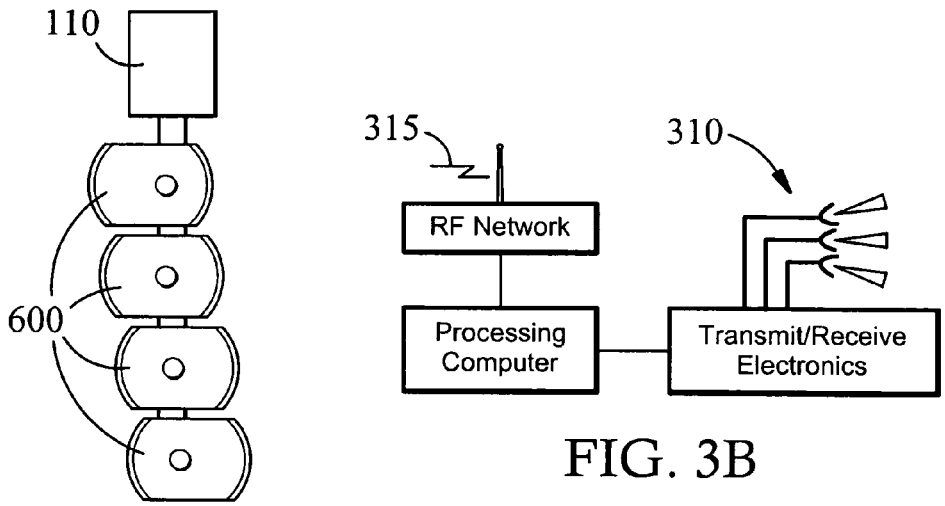
FIG. 3A
FIG. 3B
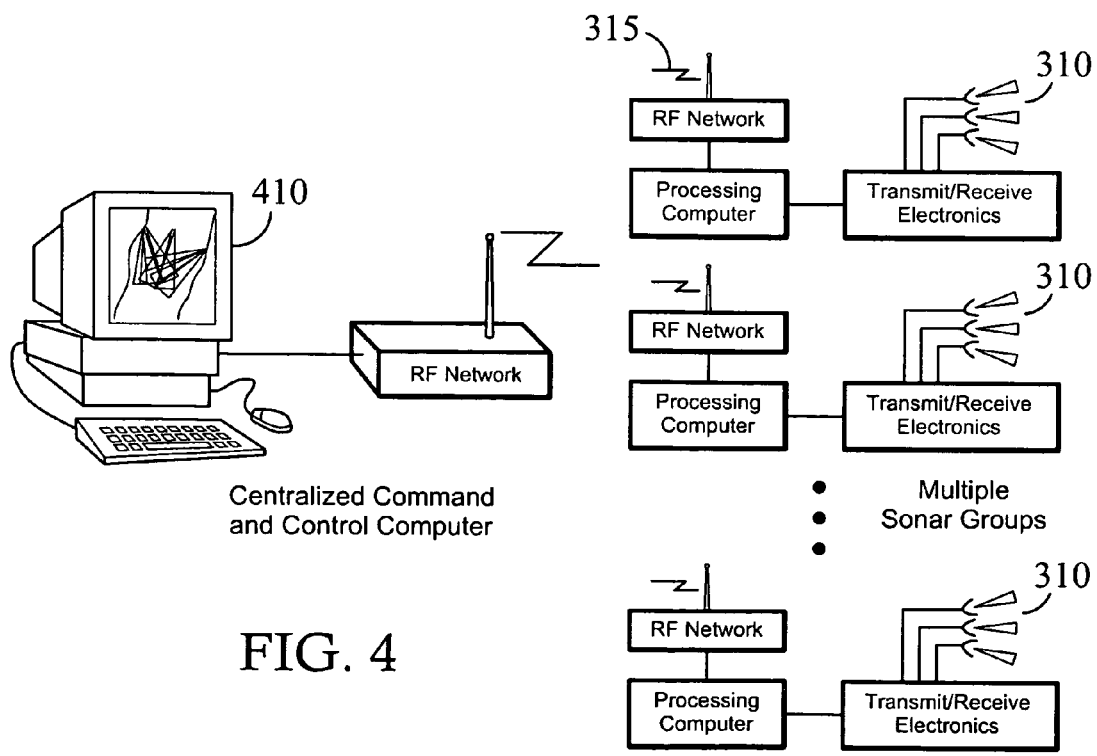
FIG. 4

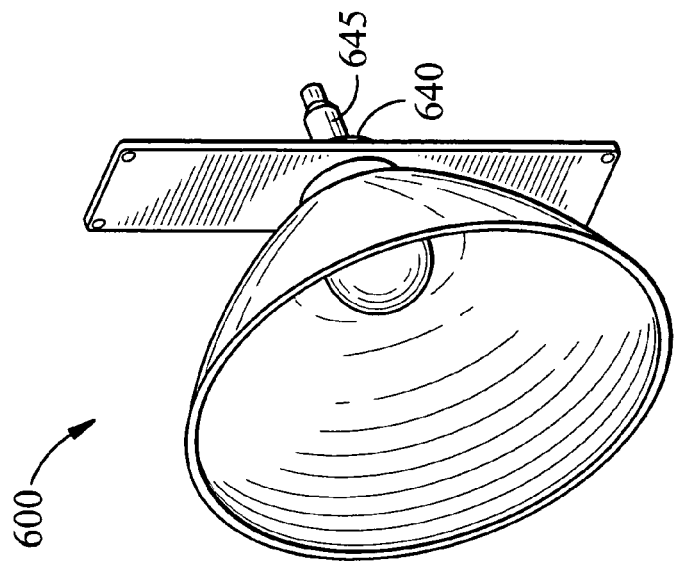
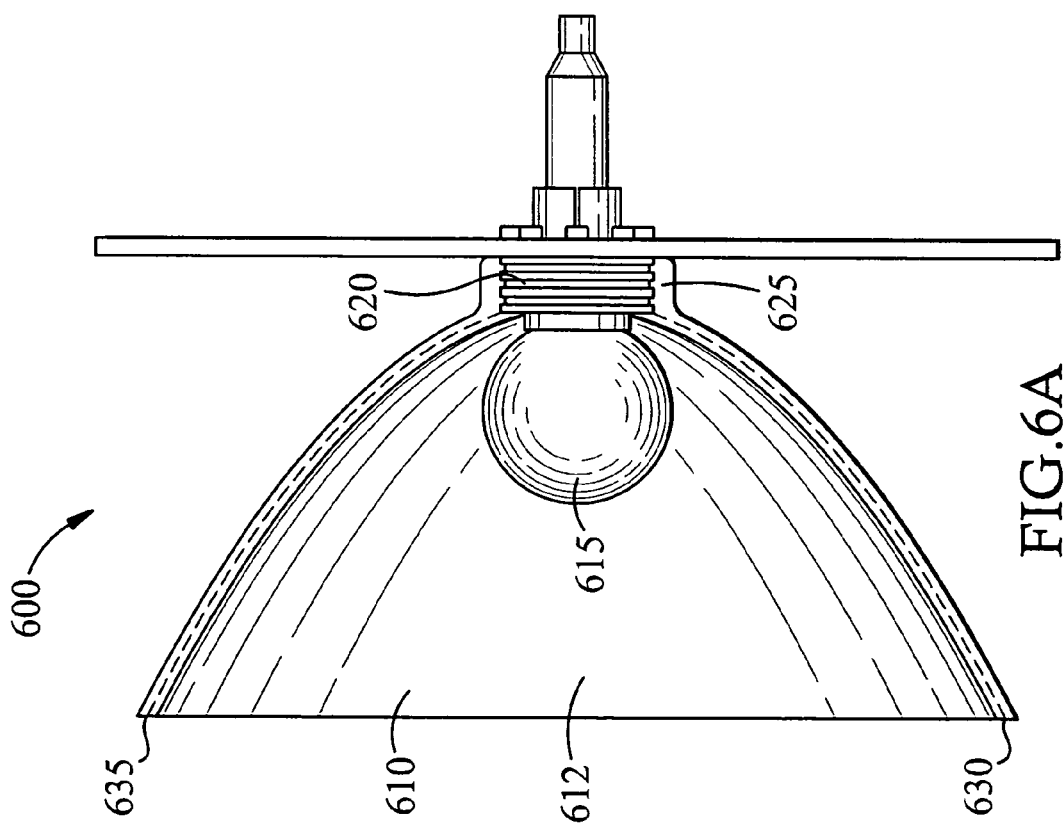

SWIMMER DETECTION SONAR NETWORK

STATEMENT REGARDING FEDERALLY SPONSORED RESEARCH OR DEVELOPMENT

This invention was made and funded by U.S. government, specifically by the Office of Naval Research under Contracts N00014-03-M-0177, N00014-04-C-0103, N00014-06-C-0330 and N00014-07-C-0065. The U.S. Government has certain rights in the invention.

BACKGROUND OF INVENTION

This invention relates generally to the protection of waterways such as harbors, rivers, lakes, etc. and, more particularly, to an acoustic surveillance system designed to track a swimmer or underwater vehicle or target or object or the like that could pose a danger to ships and other installations in a harbor.

Ships and other installations in a waterway or other water source are vulnerable to interlopers who can penetrate into the area by swimming undetected into the area. A defense against such a threat is a surveillance system that continuously monitors the region for swimmers. Electromagnetic waves do not travel far in water. Similarly the effectiveness of using light to probe the water is limited because of the poor visibility. On the other hand sound can travel far in water. Hence the swimmer detection systems currently available are generally sonar systems.

Current swimmer detection systems are generally active systems, i.e. they transmit a high frequency acoustic pulse into the water. The acoustic pulse, when incident on an object, reflects some of the incident acoustic energy. This reflected energy is sensed by a sonar system and the sonar system then makes the decision whether the object is a threat or not. Once a threat is detected this information is passed on for action to be taken against the threat. Some of the basic requirements for such a system are:
  1. The range for detection of an object such as a swimmer should be as large as possible, but must be sufficient to react to the threat. The detection range is a function of the characteristics of the acoustic pulse (frequency, duration, signal type, etc.), the acoustic source level, the directivity of the source, the ambient noise, the strength of interfering returns from false targets, and the strength of the target return.
  2. Robust signal processing schemes are needed that analyze the reflected acoustic signal and decide whether a threat exists or not.
  3. The area to be covered by the system is generally large, and, due to limitations in detection range, will therefore require a number of units to be deployed. To limit the overall cost of the installation, the cost of each individual unit has to be low.
  4. The system has to be capable of operating unattended for an extended period of time in the hostile ocean environment.
  5. The system would require periodic maintenance. Therefore ease of maintenance is an important consideration.
  6. Generally, the system should be capable of being mounted on different platforms.

Most swimmer detection systems that are currently available in the market use phased arrays. A phased array is an array of transducers which may be line arrays, a planar array, or a volume array. The transducer is commonly made of piezo-electric material, which has the property of converting an electrical signal to a pressure (acoustic) signal or acoustic wave and vice versa. By suitably varying the phase of the electrical input into each of the transducer, the acoustic beam emanating from this array can be made to transmit the energy in a particular direction. Similarly the reflected energy received by these transducers can be processed to discern the direction from which the energy is coming. These phased array systems are quite complex in terms of the hardware that they require and in terms of the software needed to do the phasing and analysis. The result is a very expensive system.

Considering that there are a large number of waterways that need to be overseen, there is a clear need to develop a low cost system that will meet the requirements listed above.

BRIEF SUMMARY OF THE INVENTION

The needs of the invention set forth above as well as further and other needs and advantages of the present invention are achieved by the embodiments of the invention described herein below.

According to one aspect of the present invention, a method of detecting an object located in a body of water includes generating a plurality of signals, applying each signal of the plurality of signals to a separate submerged sonar node of an array of submerged sonar nodes, detecting a reflection of the outbound acoustic wave from the object, associating the detected reflection with each generated outbound acoustic wave, and determining the presence of the object by analyzing the detected reflections associated with each outbound acoustic wave. Each submerged sonar node generates an acoustic wave outbound from the array in response to each applied signal.

In certain embodiments of the present invention, at least one of the submerged sonar nodes may include an air-backed surface. The at least one of the submerged sonar nodes may include a parabolic reflector, which may include the air-backed surface. A transducer may be located at the focus of at least one parabolic reflector, where transducer may be a hydrophone.

In other embodiments of the present invention, the plurality of signals may be substantially orthogonal. The frequencies of the plurality of signals may occupy the range of substantially 40-75 kHz. The method may further include the step of synchronizing said orthogonal signals with a precision timing mark, which may be a GPS signal.

A transmission pattern of a submerged sonar node may be overlapped with a transmission pattern of another submerged sonar node. Transmission patterns generated from the sonar nodes comprising the array may be combined, with the combined transmission pattern occupying a lateral angle of substantially 45 degrees. The object may be a swimmer, a swimmer delivery vehicle, an underwater vehicle, or a non human among other possible embodiments.

According to another aspect of the present invention, a system for detection of an object located in a body of water includes means for generating a plurality of signals, an array of submerged sonar nodes, means for associating the detected reflection with each generated outbound acoustic wave that was the source of the reflection, and means for determining the presence of the object from the detected reflection. Each submerged sonar node is capable of receiving at least one of the plurality of signals, of generating an acoustic wave outbound from the array in response to the respective at least one of the signals, and of detecting a reflection of the outbound acoustic wave from the object.

According to additional embodiments of the present invention, at least one of the submerged sonar nodes may include an air-backed surface. At least one of the submerged nodes may include a parabolic reflector, which may include the air-backed surface. At least one of the submerged sonar nodes may include a transducer located at the focus of the parabolic reflector. The transducer may be a hydrophone.

According to certain other embodiments of the present invention, the array may be mounted to a land-fixed structure, which may be a dock. According to further additional embodiments of the present invention, at least one of the submerged sonar nodes may have a range of at least substantially 700 meters. According to additional embodiments of the present invention, at least one of said submerged sonar nodes may have a range of less than substantially 700 meters.

For a better understanding of the present invention, together with other and further needs thereof, reference is made to the accompanying drawings and detailed description and its scope will be pointed out in the appended claims.

BRIEF DESCRIPTION OF THE DRAWINGS

FIG. 3A is a schematic illustration of a node of an embodiment of the present invention in which dishes (or reflectors) are pointing in different directions;

FIG. 3B is a schematic of the data acquisition system of the node of FIG. 3A according to an embodiment of the present invention;

FIG. 4 is a schematic illustration of the network including associated data acquisition systems at each node connected to a central command and control computer according to an embodiment of the present invention;

FIG. 6A is a pictorial of an embodiment of the present invention showing a section view of a parabolic dish with the hydrophone inserted it;

FIG. 6B is a pictorial of an embodiment of the present invention showing an isometric view of a parabolic dish with the hydrophone inserted it;

DETAILED DESCRIPTION OF THE INVENTION

Figure 1A:
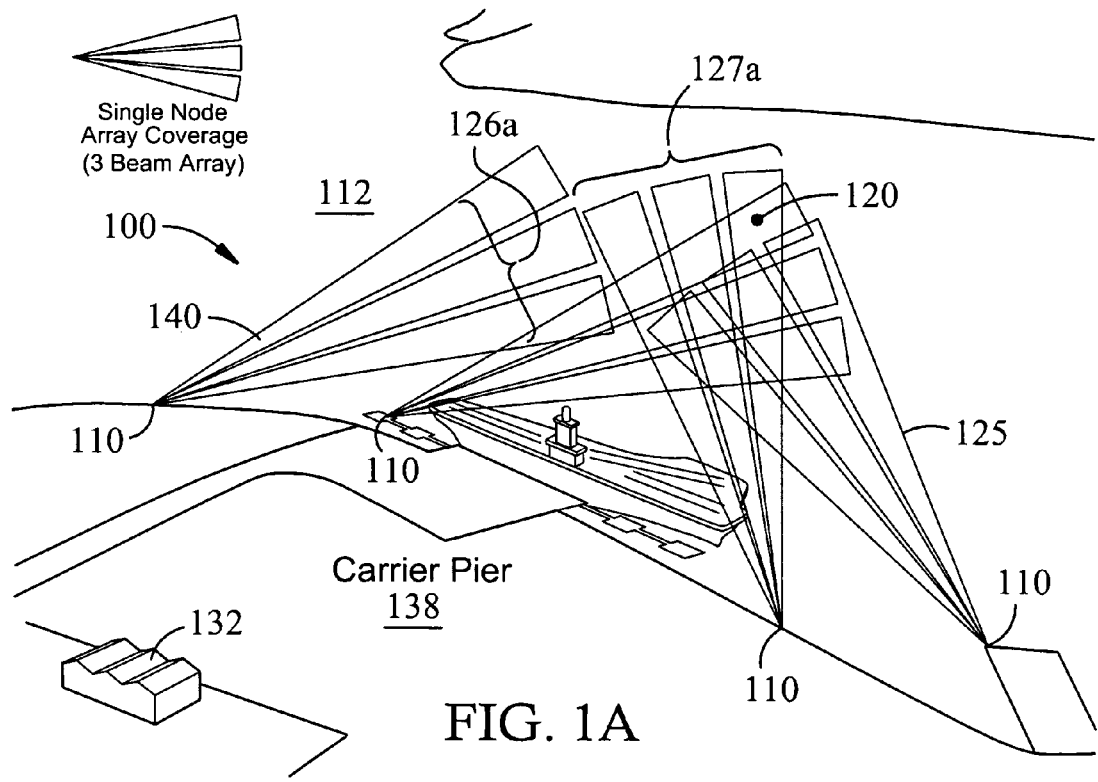
FIG. 1A is a schematic illustration of acoustic patterns associated with an embodiment of the present invention.
Figure 1B:
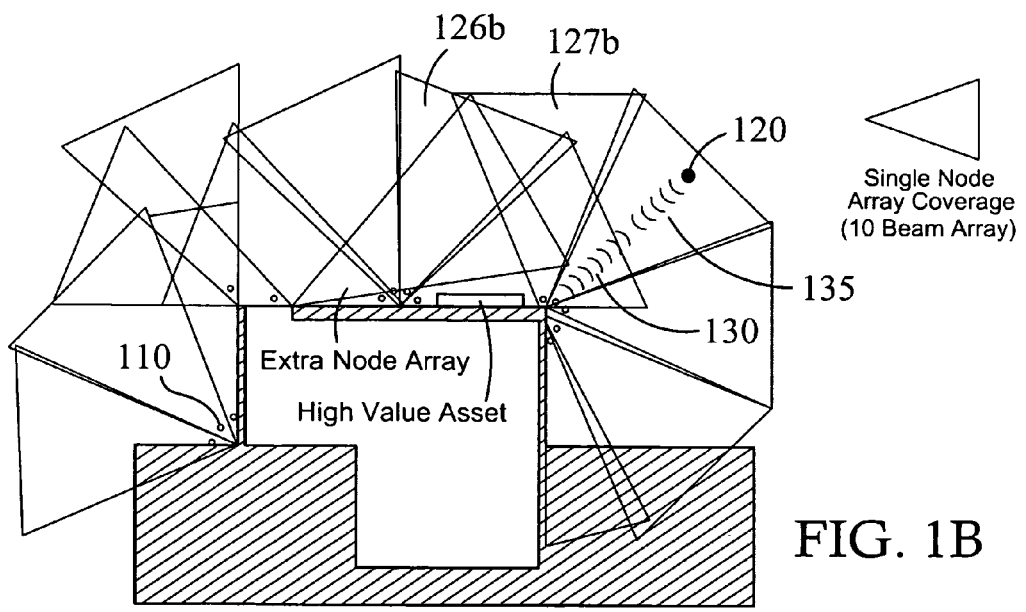
FIG. 1B is a schematic illustration of acoustic patterns associated with an embodiment of the present invention where there is overlap between the patterns.

One embodiment of the present invention is a system 100 for detection of a threat target or object 120 (such as a swimmer, a swimmer delivery vehicle, an underwater vehicle, for example, an autonomous underwater vehicle, a non human, for example, a fish, or the like) for harbor protection, as shown in FIG. 1A and FIG. 1B. FIG. 1A contains a spatially distributed set of node arrays 110 which are designed to be submerged in a body of water 112 and to cover a sector of the total field to be protected by the surveillance system. FIG. 1B illustrates an embodiment of the present invention where there is overlap 127 between transmission patterns 126 of several adjacent node arrays 110.

Each node array 110 is comprised of a multiplicity of sonar nodes or dishes 600 (FIG. 6A). In the embodiment of the present invention shown in FIG. 6A, the dish 600 comprises a transducer 615 placed at the focus 215 (FIG. 2) of a parabolic reflector 610. The transducer 615, which may be a hydrophone, acts as both a transmitter and a receiver of acoustic waves.

The reflectors 610 are designed to function as air-backed reflectors. In other embodiments, the dish 600 may be a spherical reflector or a 45 degree cone reflector with a line array along the axis.

An air-backed reflector 610 for underwater acoustics is one in which the reflective surface 612 is lined with a layer 635 of material that contains enough air so as to form a low impedance to the acoustic wave and is hence a very reflective surface. The material may be a foam or a cork rubber or other material which reflects sound by having a low acoustic impedance. In general, this is any material which traps air within the constituent of the material.

Figure 2A:
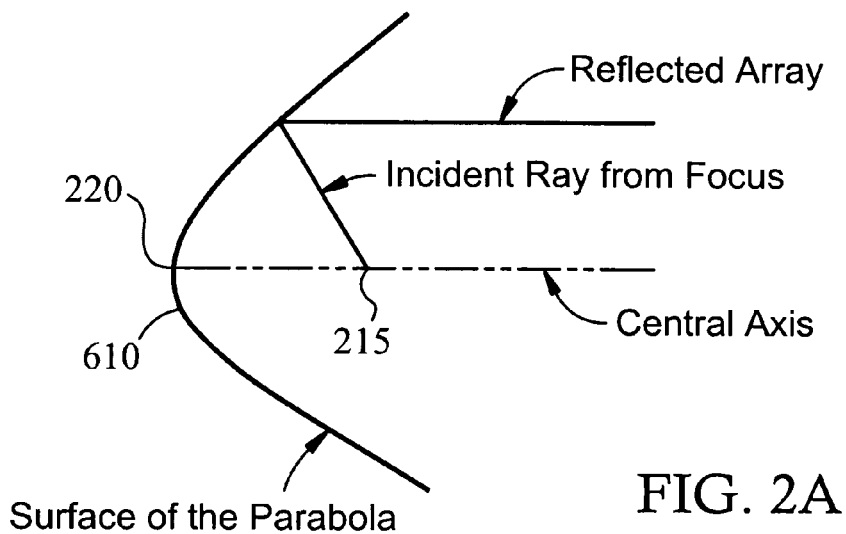
FIG. 2A is a schematic illustration of a single reflector of an embodiment of the present invention.
Figure 2B:
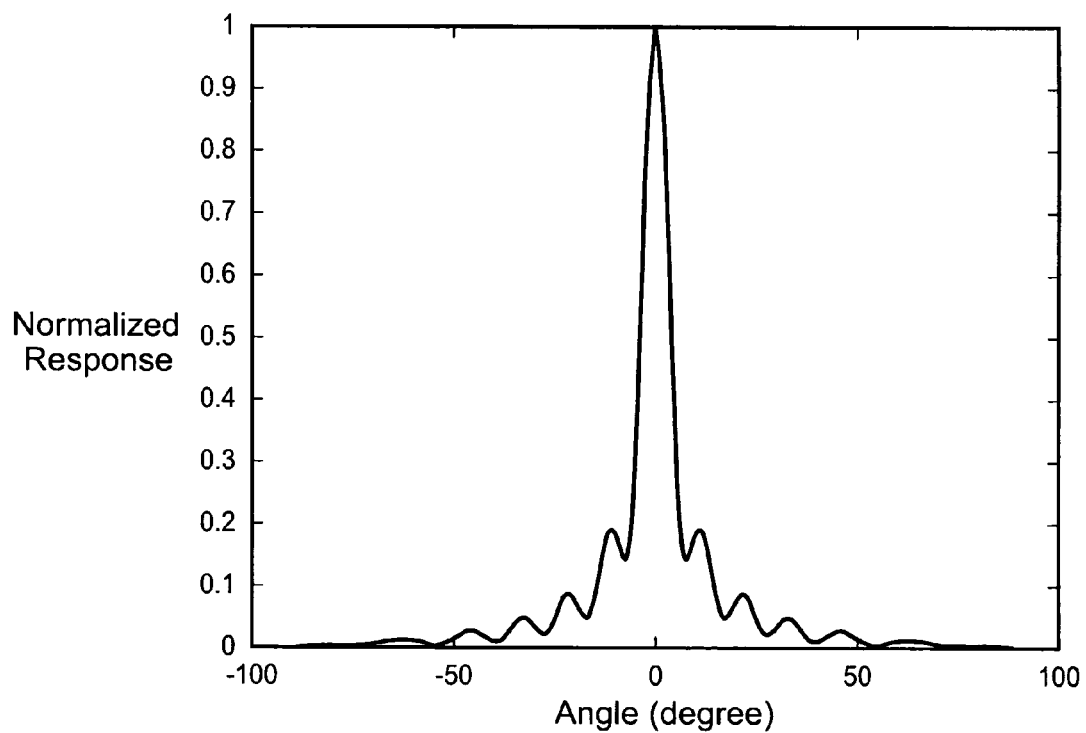
FIG. 2B is a diagram of the beam pattern of the reflector of FIG. 2A according to an embodiment of the present invention.

FIG. 2A shows the schematic diagram of a single parabolic reflector 610 and the beam pattern 215 of the reflector 610 according to an embodiment of the present invention. The advantage of using a parabolic reflector 610 or reflectors 610 with other types of curvature (spherical, elliptical) is that the dishes 600 with parabolic or such reflectors 610 are able to form the transmit/receive beams without any phased array system. In order to resolve multiple targets in the area it is desirable to use high frequency. Higher the frequency the narrower will be the beam for a given dish 600. Typically the system uses frequency in the range of substantially 40 to 75 kHz. At these frequencies, a dish 600 with a parabolic reflector 610 with a 12 inch aperture and with a focal distance of 1.5 inches produces a transmit/receive beams of widths from 6.9 degrees to 5 degrees. Therefore, for a node array 110 to cover an angular field or lateral angle of substantially 45 degrees will require a number of dishes 600 with parabolic reflectors 610 suitably placed or a system which may be mechanically steered to look in different directions. In a certain embodiment, a number of dishes 600 are physically displaced and aimed as a result of the respective connection of a back 645 of each reflector 610 to an attachment point 640, so that the dishes 600 point (i.e. look) in different directions.

Figure 20A:
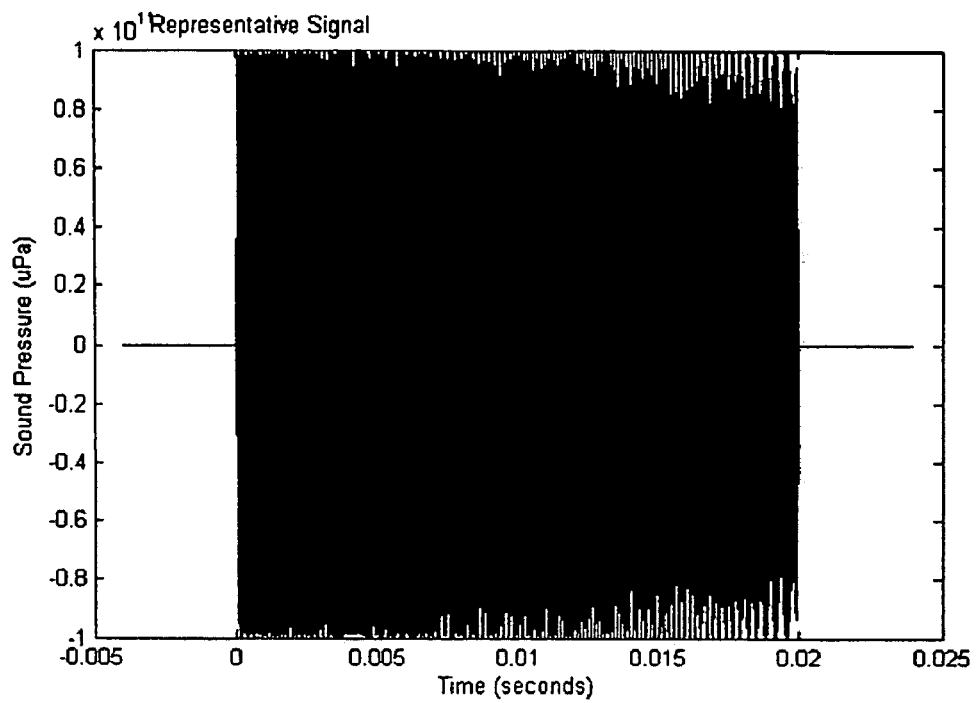
FIG. 20A is a time plot of a representative applied electrical signal applied to a transducer according to an embodiment of the present invention.

An applied or a transmission signal or applied or transmission electrical signal 2005, as shown representatively in FIG. 20A according to an embodiment of the present invention, applied to a transducer 615 within a submerged dish or node 600 results in an outbound acoustic wave 130 (FIG. 1B) that travels outward substantially within the beam width 140 of the dish 600. If the outbound acoustic wave 130 encounters a target or object 120, a portion is reflected, and a portion of the reflected acoustic wave 135 is received at the submerged node 600 and is converted by the transducer 615 into a received signal or a received electrical signal 2010, as shown representatively in FIG. 20B according to an embodiment of the present invention.

In operation of the system of this invention, a plurality of applied signals 2005 are generated, one for each transducer 615 of a node array 110 within a system 100 of node arrays 110. The transducer 615 then generates an outbound acoustic wave 130. Upon impingement of the outbound acoustic wave 130 with a target or object 120, a reflected acoustic wave 135, a version of the outbound acoustic wave 130 is produced. Impingement of the reflected acoustic wave 135 on the transducer 615 then produces a detected or received or return signal or a detected or received or return electrical signal 2010.

According to an embodiment of the present invention, location of a target 120 involves associating return signals 2010 with the transducers 615 and associated nodes 600 to which were applied the applied signals 2005 that were the sources of the return signals 2010. In one embodiment of the present invention, the applied signals 2005 applied to one dish 600 may be made to be different from most or all of the other applied signals 2005 applied to other dishes 600. This is called being orthogonal.

Orthogonality can be achieve by temporal differences, in which the applied signal 2005 is applied at different times to different transducers 615 where there is none or little temporal overlap between the return signals 2010. To maintain the proper time relationship between the applied signals 2005, the applied signals 2005 may be synchronized with a GPS signal or other hard-wired precision timing signal.

Orthogonality can also be achieved by frequency and signal diversity, where applied signals 2005 applied to different transducers 615 in dishes 600 have different frequency content or have signals of different forms. The unique applied signal 2005 transmitted by one transducer 615 or dish 600 may be identified through a match-filter process where the received or return signal 2010 is compared to a replica of the applied or transmission signal 2005 In this manner each transducer 615 can identify its own return signal 2010 (monostatics) or a return signal 2010 of another transducer 615 (bistatics) and hence locate the direction of the return.

Figure 18:
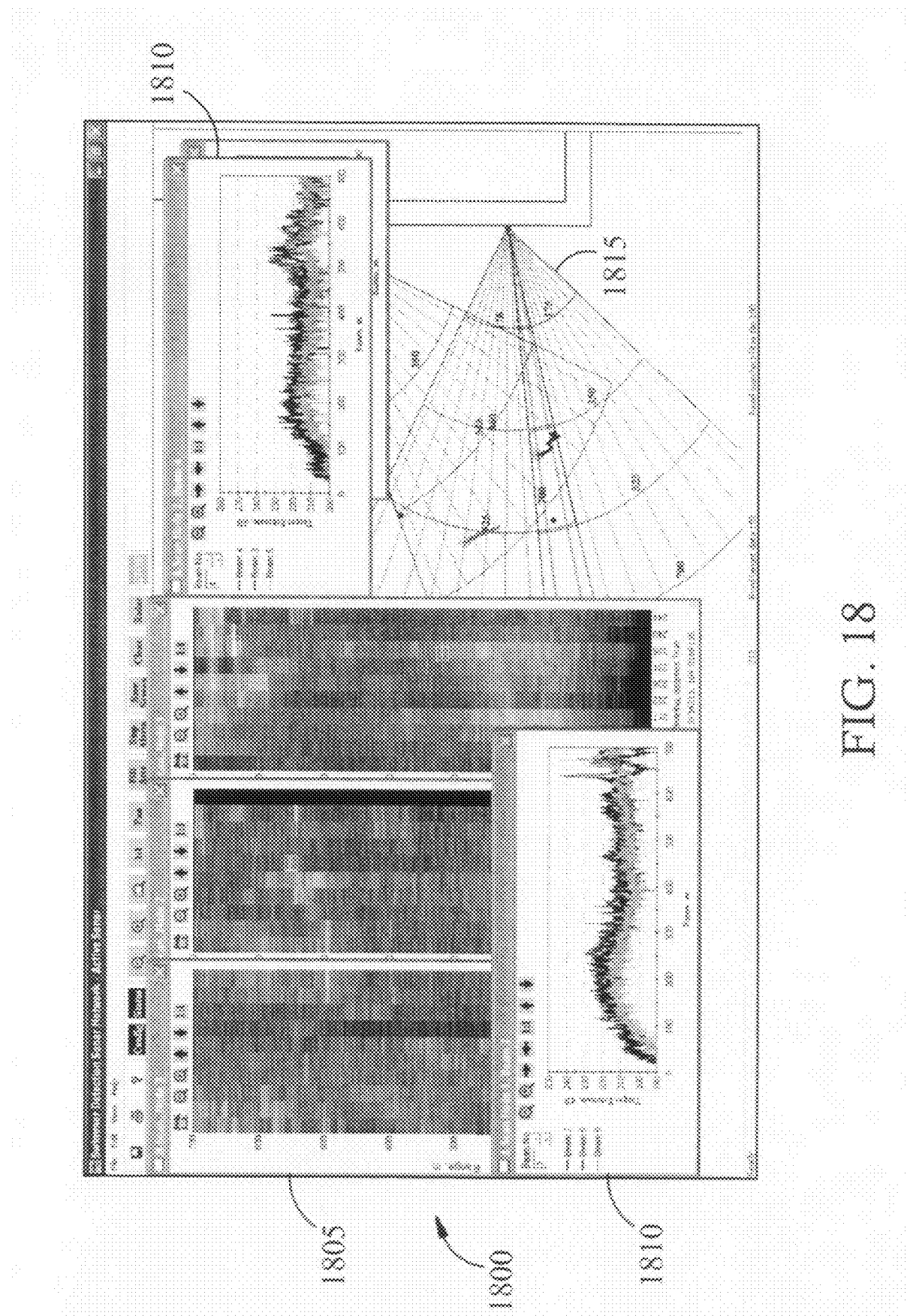
FIG. 18 is a screen shot for an embodiment of the present invention containing interrelated displays associated with the position of a swimmer and illustrating where bistatic data is available.
Figure 19A:
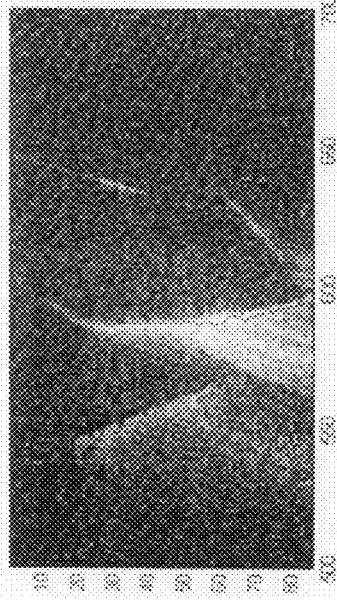
FIG. 19A is a plot of the track of an object according to an embodiment of the present invention where the receiving dish is the same as the transmitting dish (monostatic)
Figure 19C:
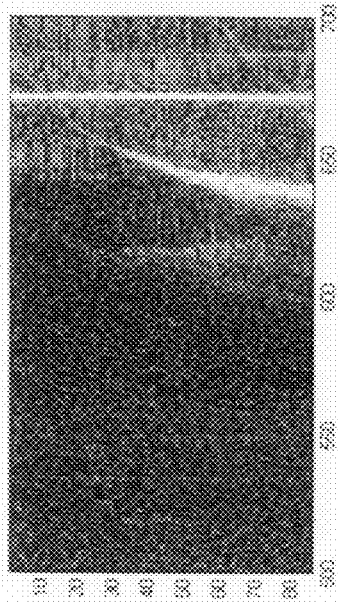
FIG. 19C is a another plot of the track of an object according to an embodiment of the present invention where the receiving dish is the same as the transmitting dish (monostatic)
Figure 19B:
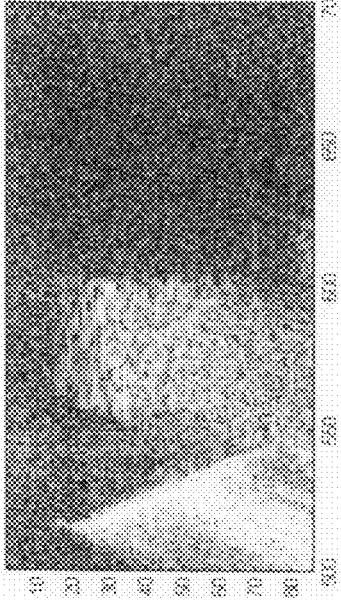
FIG. 19B is a plot of the track of an object according to an embodiment of the present invention where the receiving dish is different from the transmitting dish (bistatic)
Figure 19D:
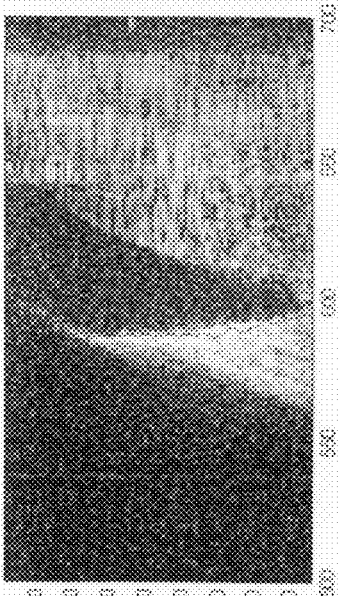
FIG. 19D is a another plot of the track of an object according to an embodiment of the present invention where the receiving dish is different from the transmitting dish (bistatic)

To improve the ability to detect a target 120, the transmission patterns 125 of different dishes 600 may be caused to physically overlap, enabling bi-static target detection where the reflected acoustic wave 135 resulting from a transmission or outbound acoustic wave 130 from one transducer 615 or dish 600 is received by another transducer 615 or dish 600 (FIG. 1B and FIG. 18). As a result, the probability of detecting a target 120 is increased and the probability of a false alarm is decreased and a target 120 is detected by several dishes 600, thereby eliminating the possibility of the target 120 falling within a gap in the system.

FIG. 3A shows a node array 110 with a number of dishes 600 pointing in different directions according to an embodiment of the present invention. FIG. 3B shows a layout of an associated data acquisition system 310 according to an embodiment of the present invention at each node array 110. The processed data from each node array 110 is transmitted via an RF link 315 or other suitable communication link, such as a hardwired copper or fiberoptic network, to a central command and control computer 410 as shown in FIG. 4.

In one embodiment of the present invention, each node array includes 10 parabolic reflectors 610 according to an embodiment of the present invention. The number and arrangements of the parabolic reflectors 610 may vary depending on the angular coverage required at each node array 110.

Figure 5:
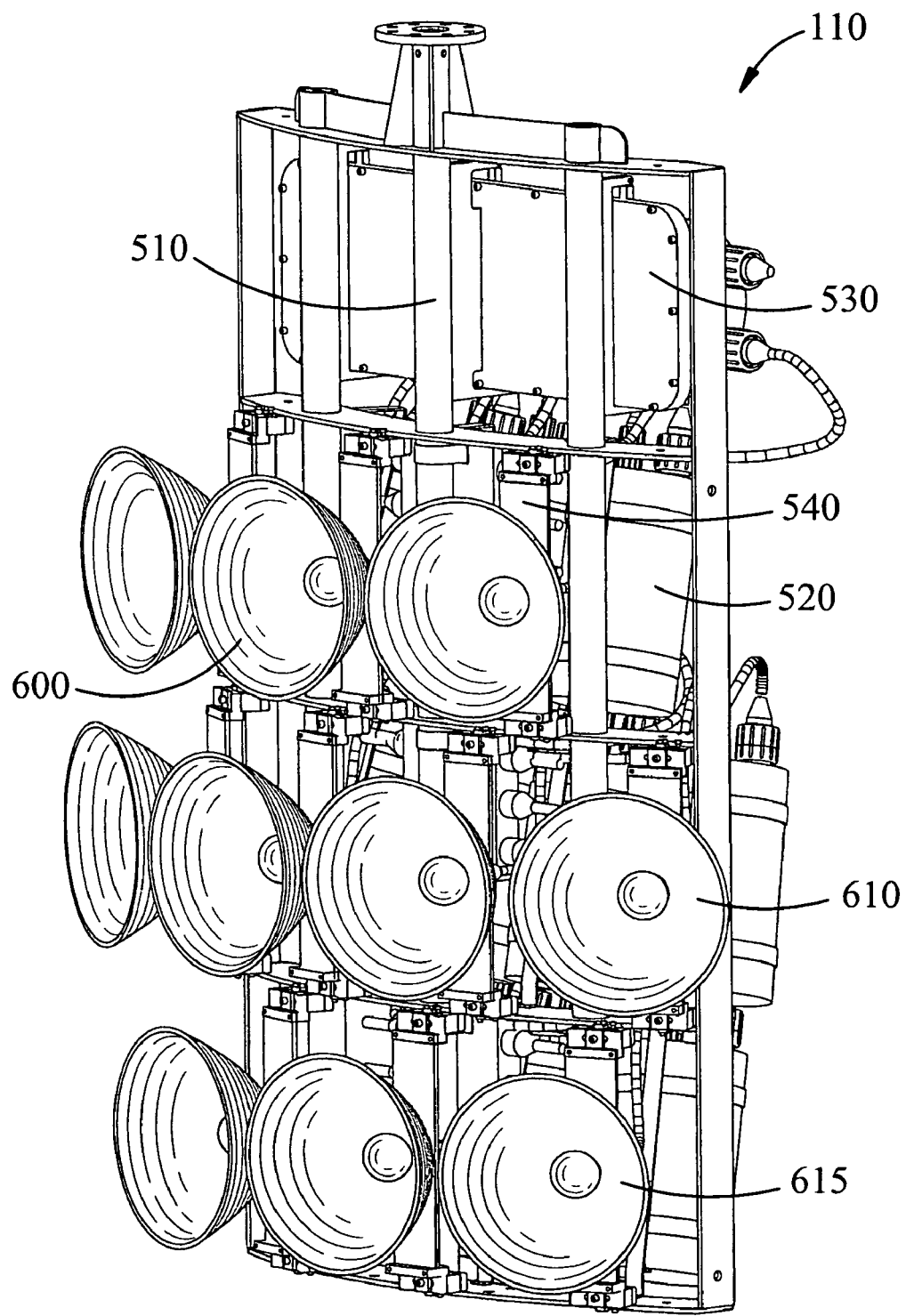
FIG. 5 is a pictorial of an embodiment of the present invention showing a single node with a plurality parabolic dishes.

FIG. 5 shows a schematic of the node array 110 with ten dishes 600 according to an embodiment of the present invention. The dishes 600 are arranged in a 3,4,3 configuration to achieve a 45 degree field of view for the system. The elements of the node array 110 are the dishes 600 with parabolic reflectors 610, one canister or can 520 for each channel which houses the associated electronics such as the transmit/receive (T/R) switch, signal conditioning electronics, power amplifier and embedded processor and the node canister 530 which contain electronics which serve all the channels like power supply and computer for controlling the operation of the node array 110.

The parabolic reflector 610 may be made of a number of different lightweight, sturdy, substantially corrosion-free materials such as fiber glass molded into the required shape. The inner surface 630 of the reflector 610 may be covered with a layer 635 of substantially acoustically reflective material, such as, but not limited to, cork rubber (i.e., Corporene®). This enables the reflector 610 to function as an air-backed surface. Other possibly suitable materials are any which trap air and do not flood in water, such as neoprene and polystyrene foam. The transducer 615 which acts as both a transmitter and a receiver is placed inside the reflector 610 such that its acoustic center is at the focus 215 of the parabola.

This arrangement may be achieved by drilling a hole 625 at the apex 220 of the parabola and inserting a mounting 620 with the transducer 615 into this hole 625 and securing the mounting 620 to the reflector 610 as shown in FIG. 6A and FIG. 6B according to an embodiment of the present invention. A metal frame work 510 in FIG. 5 holds all the ten dishes 600 with the dishes 600 oriented such as to obtain the required field of view. The frame 510 also carries ten canisters 520, one for each dish 600. These canisters 520 (referred to as channel canister) contain the electronics required to transmit an outbound acoustic wave 130 and then the record the reflected acoustic wave 135 reflected from the target 120.

Figure 7A:
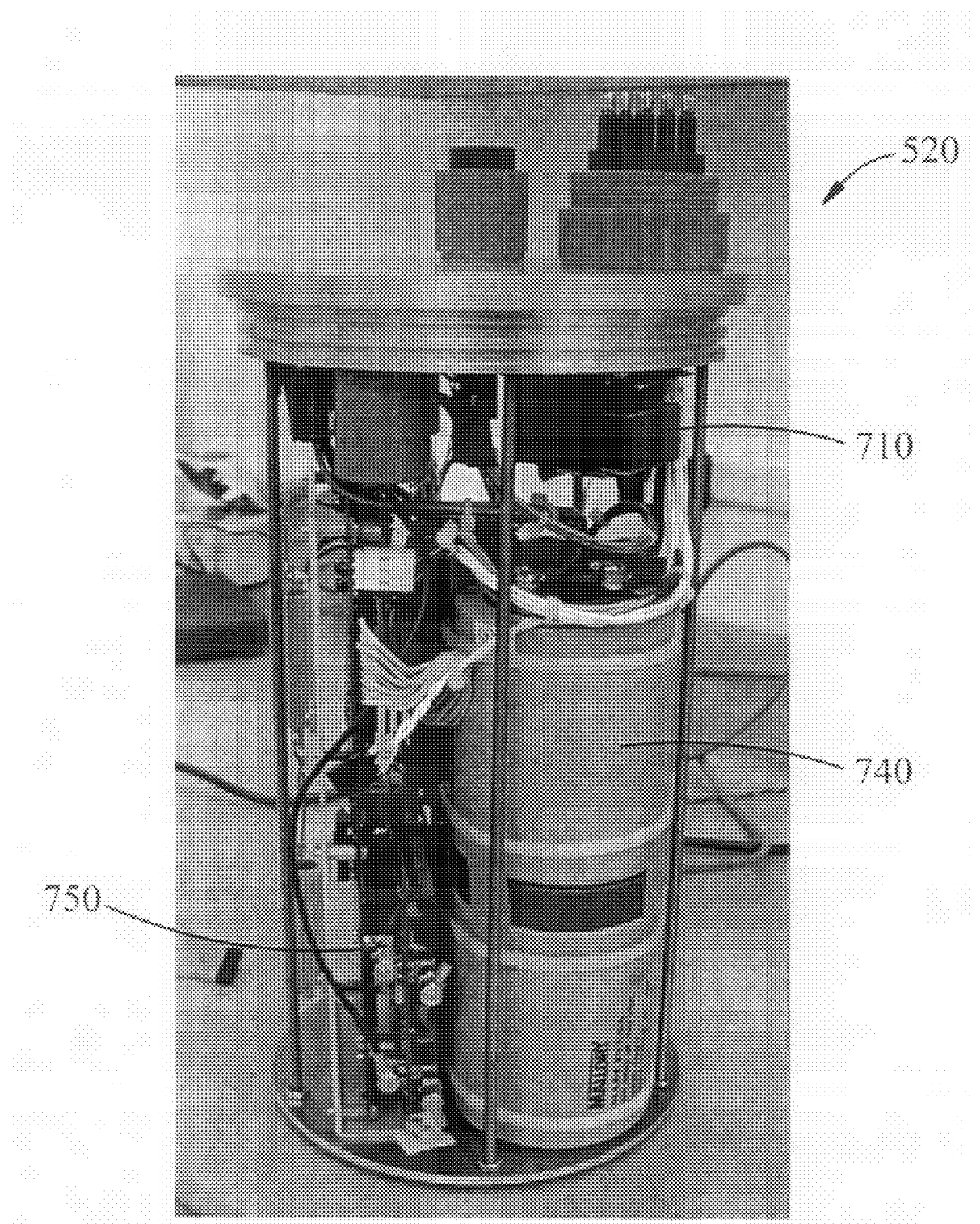
FIG. 7A is an illustration of the channel canister according to an embodiment of the present invention.
Figure 7B:
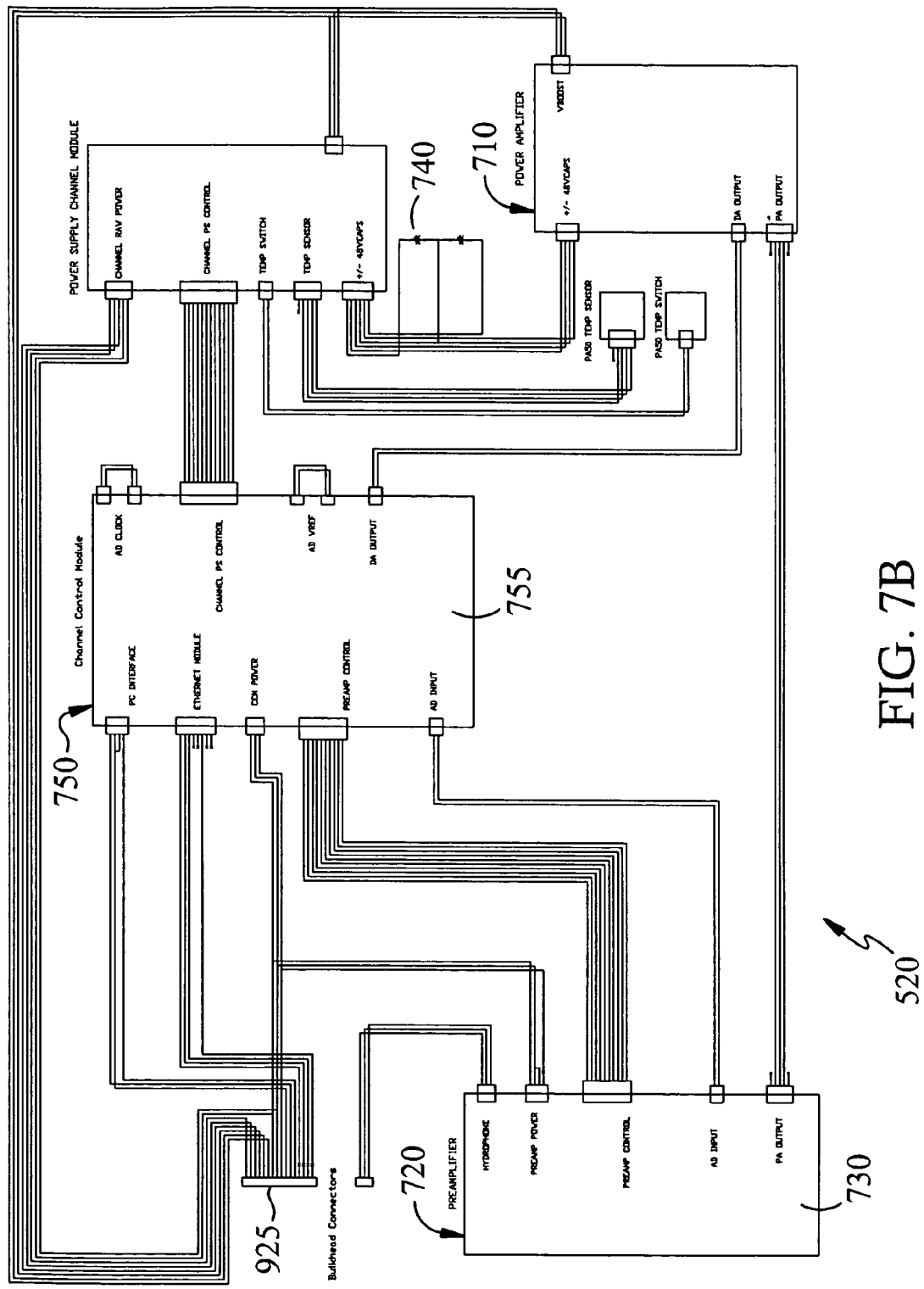
FIG. 7B is a schematic diagram of the channel canister according to an embodiment of the present invention.

An illustration of the channel canister 520 is shown in FIG. 7A and a schematic diagram of the channel canister 520 in FIG. 7B according to an embodiment of the present invention. The channel canister 520 performs the following functions. It transmits the outbound acoustic wave 130 into the water by energizing the transducer 615 in the dish 600. The echo or reflected acoustic wave 135 from the target 120 is acquired, converted into the return signal 2010, and transferred to the node canister 530. In aid of these functions the channel canister 520 has a power amplifier 710, a pre-amplifier 720 with an integrated transmission/receive (T/R) switch 730, a channel control module 750, which contains a data acquisition system 755, which digitizes the received or return signal 2010 and storage capacitors 740 and other electronics subsystems needed for power distribution within the canister 520.

Figure 8A:
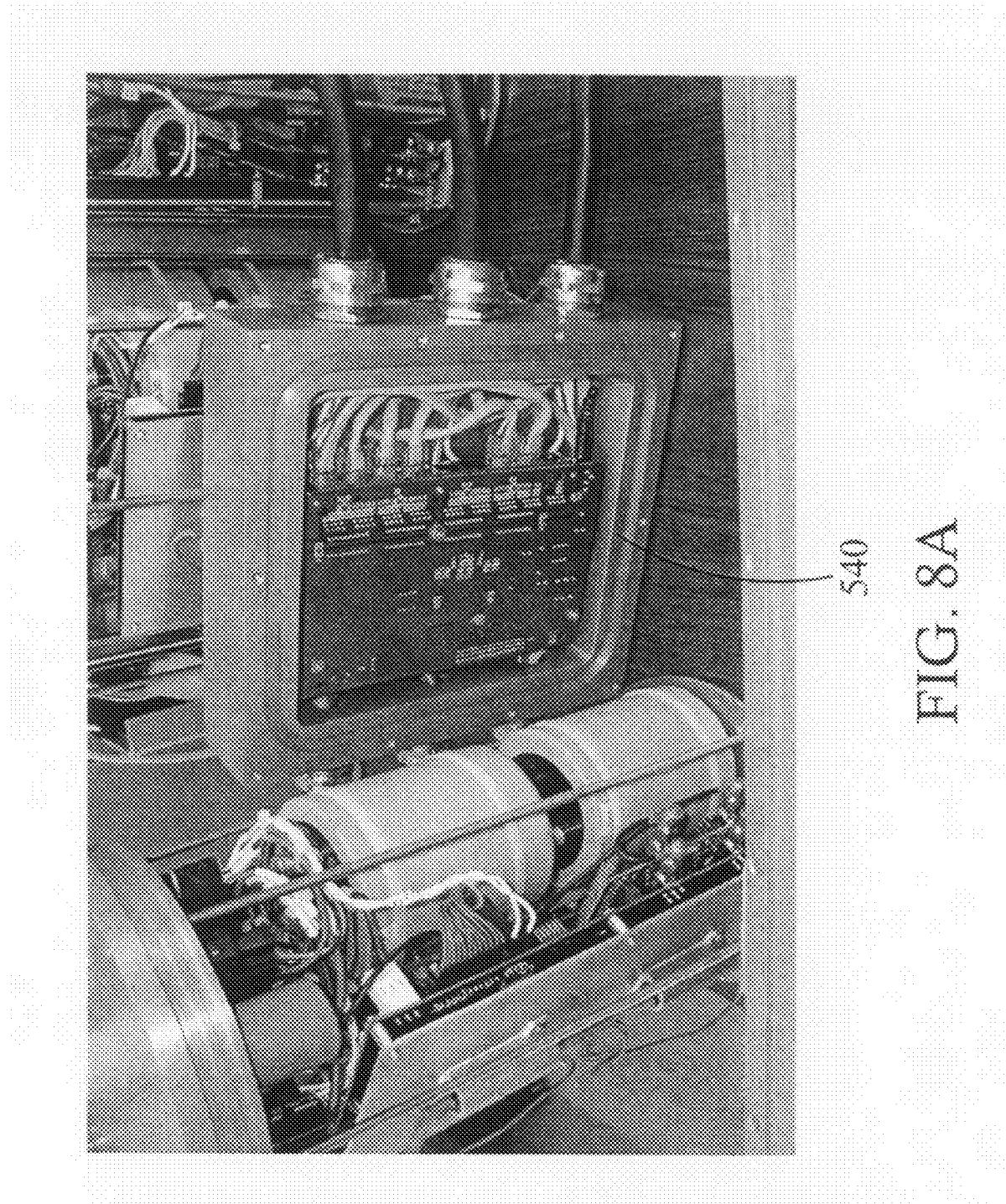
FIG. 8A is an illustration of the wet side junction box according to an embodiment of the present invention.
Figure 8B:
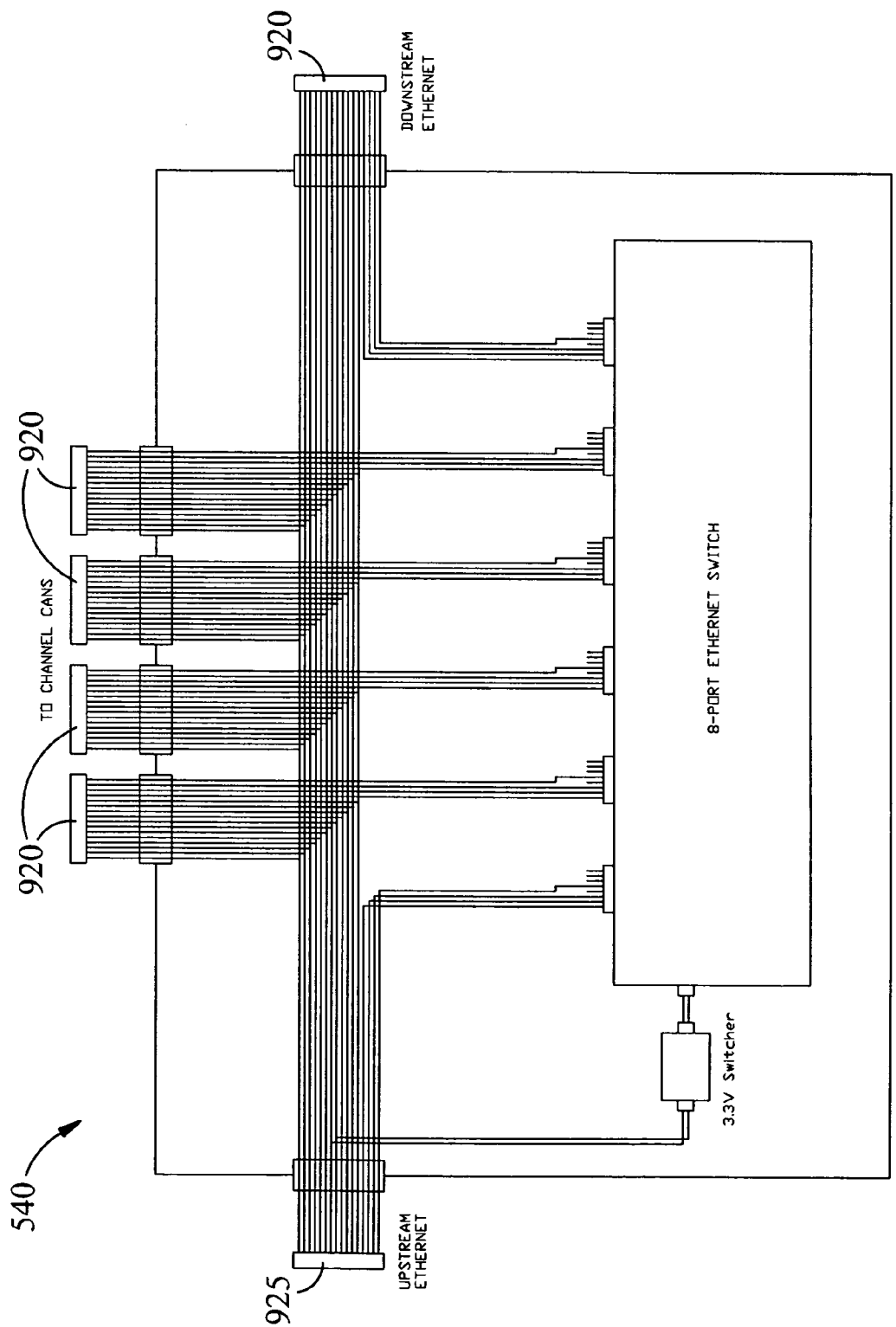
FIG. 8B is an schematic diagram of the wet side junction box according to an embodiment of the present invention.

The communication between the channel canister 520 and the node canister 530 is through an ether net connection which passes through a wet side junction box 540. In this configuration there are three wet side junction boxes 540 which are connected in series. Each of these wet side junction boxes 540 serves three or four dishes 600 (as the case may be). The wet side junction boxes 540 have the electronics needed to have the channel canister 520 communicate with the node canister 530 and vice versa. An illustration of the wet side junction box 540 is shown in FIG. 8A and a schematic diagram of the wet side junction box 540 in FIG. 8B.

Figure 9A:
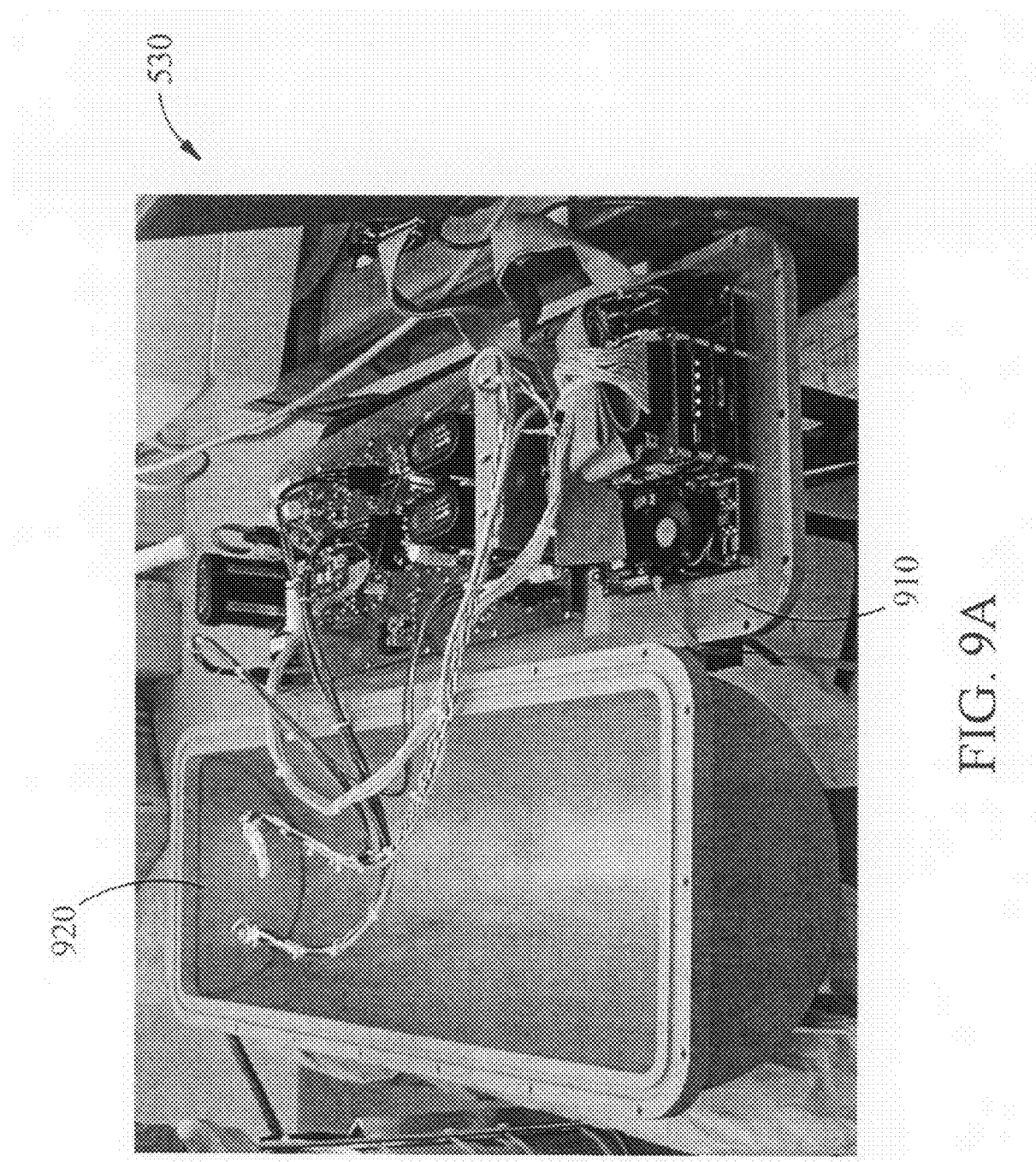
FIG. 9A is an illustration of the node canister of an embodiment of the present invention.
Figure 9B:
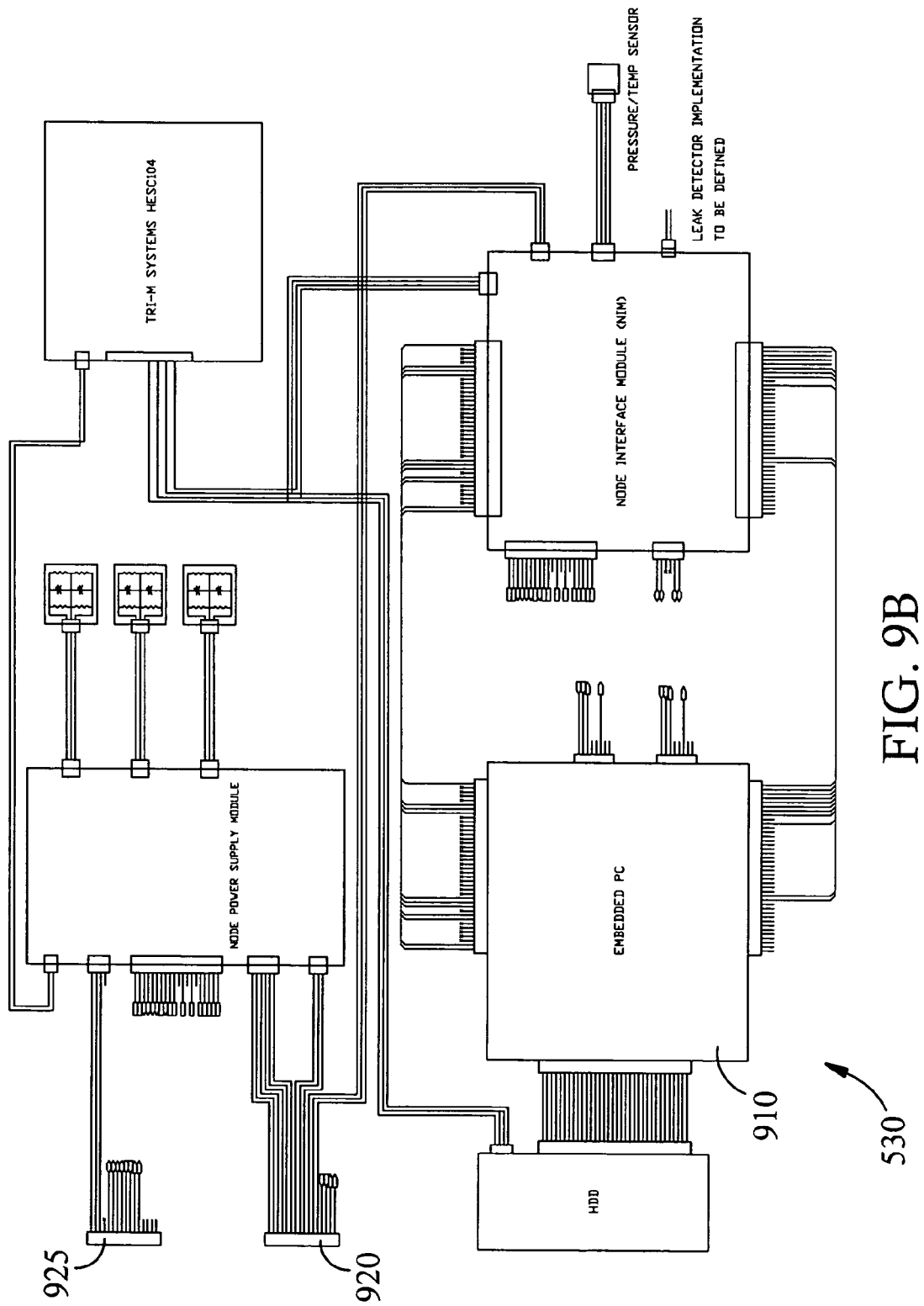
FIG. 9B is an schematic diagram of the node canister of an embodiment of the present invention.
Figure 10A:
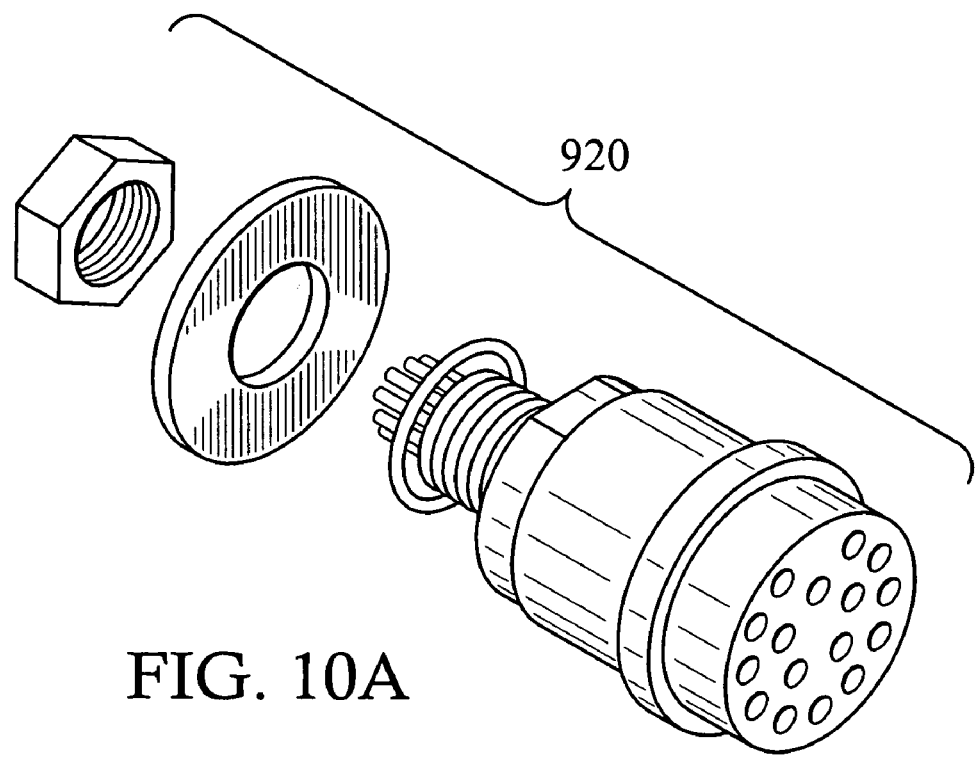
FIG. 10A is an exploded pictorial illustration of a female cable connector according to an embodiment of the present invention.
Figure 10B:
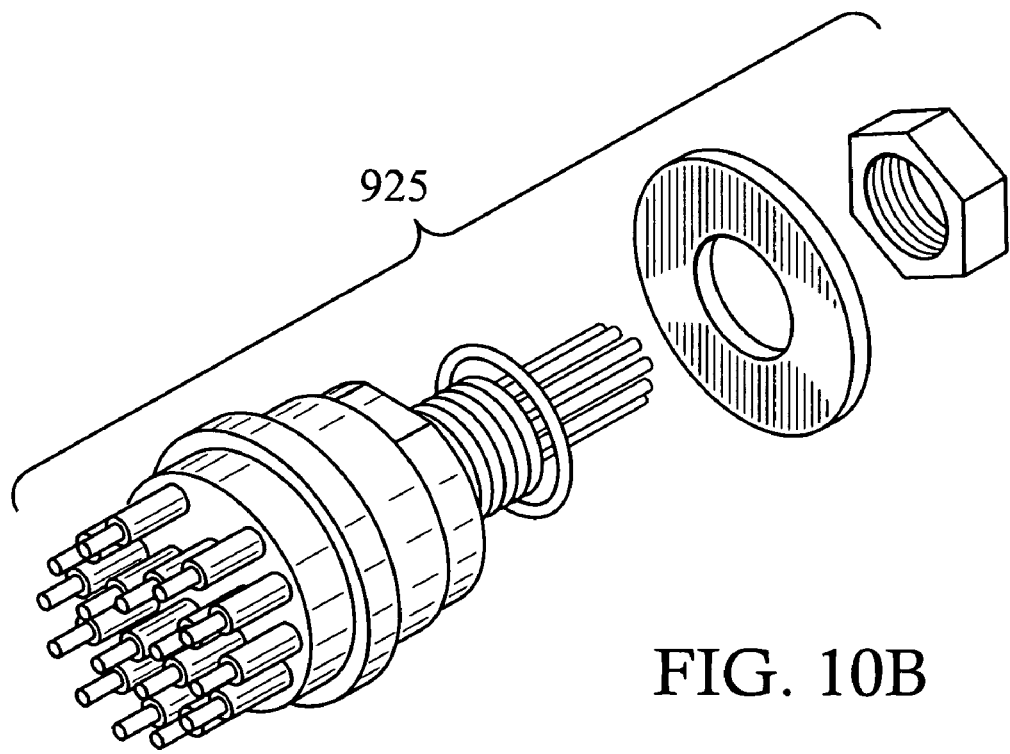
FIG. 10B is an exploded pictorial illustration of a male cable connector according to an embodiment of the present invention.

FIG. 9A is an illustration of the node canister 530 and FIG. 9B is a schematic diagram of the node canister 530 according to an embodiment of the present invention. The node canister 530 is a distributor of power supply for each channel. In addition it houses the node computer 910. Node computer 910 performs some of the signal processing of the echo or return signal 2010. The node canister 530 also obtains information on the type of applied signal 2005 to be transmitted, the ping rate and other parameters of the applied signal 2005 and transfers it to the channel canister 520. There is thus a flow of information through the node canister 530 between the channel canister 520 and the signal processing and display PC or processing work station 1115 (see FIG. 10).

The channel canisters 520, the wet side junction boxes 540, and the node canisters 530 are secured to the metal frame 510 carrying the dishes 600. The metal frame 510 carrying the dishes 600, the channel canisters 520, the wet side junction boxes 540, and the node canisters 530 are the placed in the water at a suitable depth depending on the area to protect. In some cases, the metal frame 510 may be deployed at the mid-water column, that is, substantially half-way between the surface of the water and the bottom on which the water rests. In other cases, the metal frame 510 may be deployed between substantially 1 meter and substantially 3 meters above the bottom. The canisters 530, the junction boxes 540, and female cable connectors 920 (FIG. 10A) and male cable connectors 925 (FIG. 10B) are therefore water tight according to an embodiment of the present invention.

As a consequence of the ability of embodiments of the present invention to distinguish between return signals 2010 associated with different reflected acoustic waves 135, the system 100 may detect targets 120 at distances of up to and of more than substantially 700 meters from the submerged nodes 600 (FIG. 1A). As a result, detection is possible with the node arrays 110 mounted to a land-fixed structure 138 such as a dock or pier 140 rather than being suspended in the water at a distance from the pier 140. Such an arrangement makes maintenance significantly easier, as the node arrays 110 may be lifted onto the pier 140 for examination. The detection range of more than substantially 700 meters has been proven in trials conducted with the embodiment of the invention shown in FIG. 5 deployed in a typical harbor environment.

Figure 11:
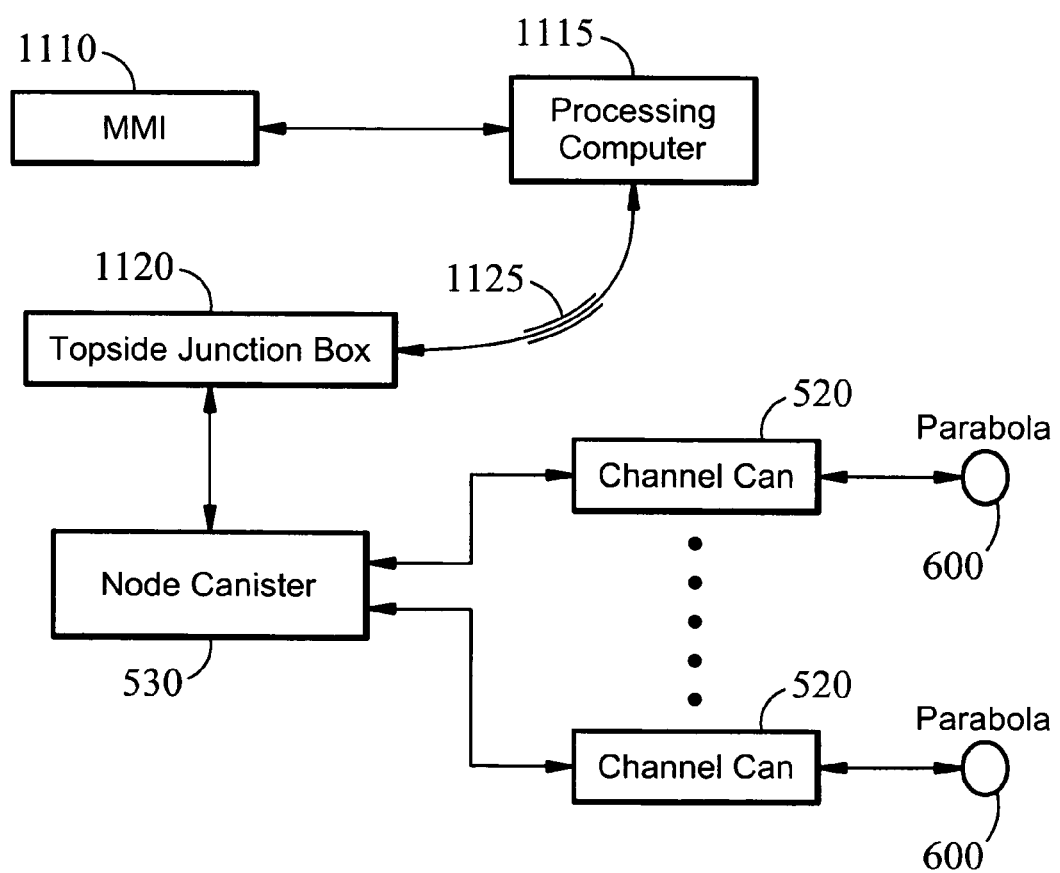
FIG. 11 is a schematic diagram showing the flow of command instructions and data between the units of an embodiment of the present invention.
Figure 12A:
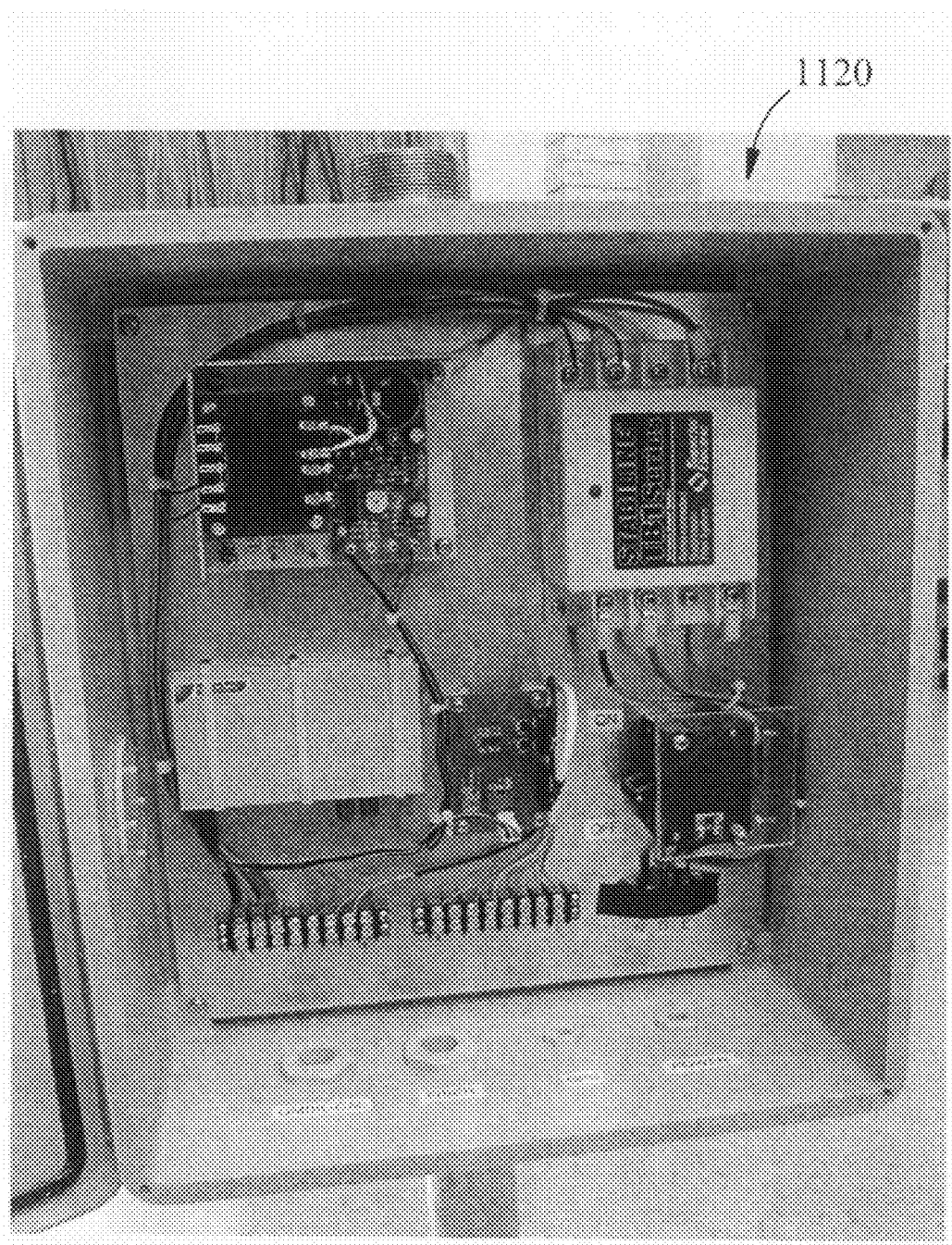
FIG. 12A is an illustration of a top side junction box according to an embodiment of the present invention.
Figure 12B:
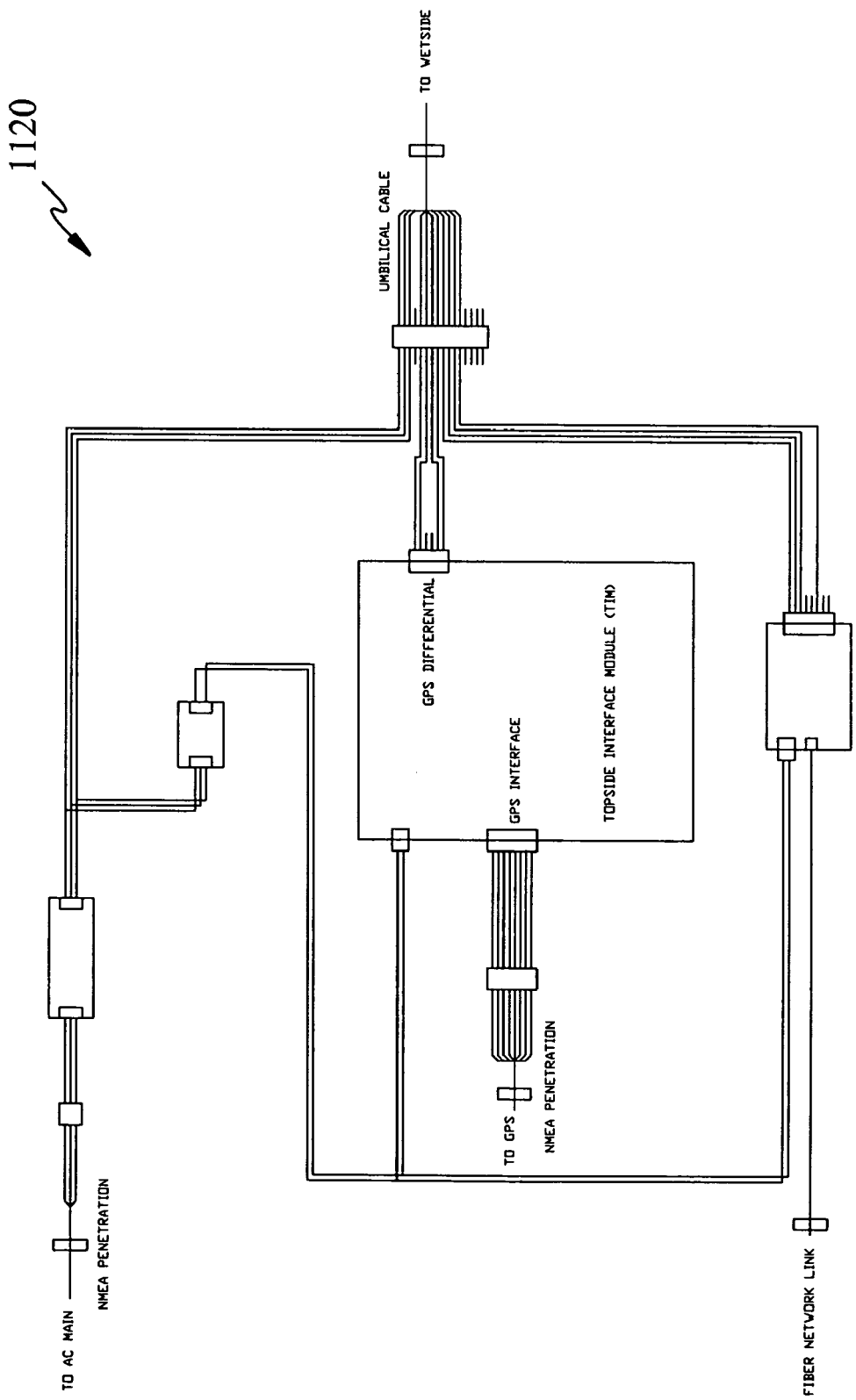
FIG. 12B is a schematic diagram of a top side junction box according to an embodiment of the present invention.

As shown in FIG. 11, on the pier 120, the system 100 has three major components according to an embodiment of the present invention. These are the topside junction box 1120, a processing work station 1115, and man/machine interface 1110. The man/machine interface (MMI) 1110 is at the command center 132. It displays tracks of intruders within the region under surveillance. The signal type, signal duration, repetition rate, and other pertinent information are sent from this command center 132 (FIG. 1) to the top side junction box 1120 from where the information is passed on to the node canister 530. The MMI also receives information from the processing work station 1115. The processing work station 1115 obtains data from all the node arrays 110. This data is analyzed by the work station 1115 and tracks of potential threats are passed on to the MMI 1010 for display. The communication between the top side junction box 1120 and the MMI/processing work station 1110 is by fiber optic cable 1125. The flow of data to and from the various units is shown in the flow diagram at FIG. 11. FIG. 12A is an illustration of a top side junction box 1120 and FIG. 12B is a schematic diagram of a top side junction box 1120 according to an embodiment of the present invention.

Figure 13:
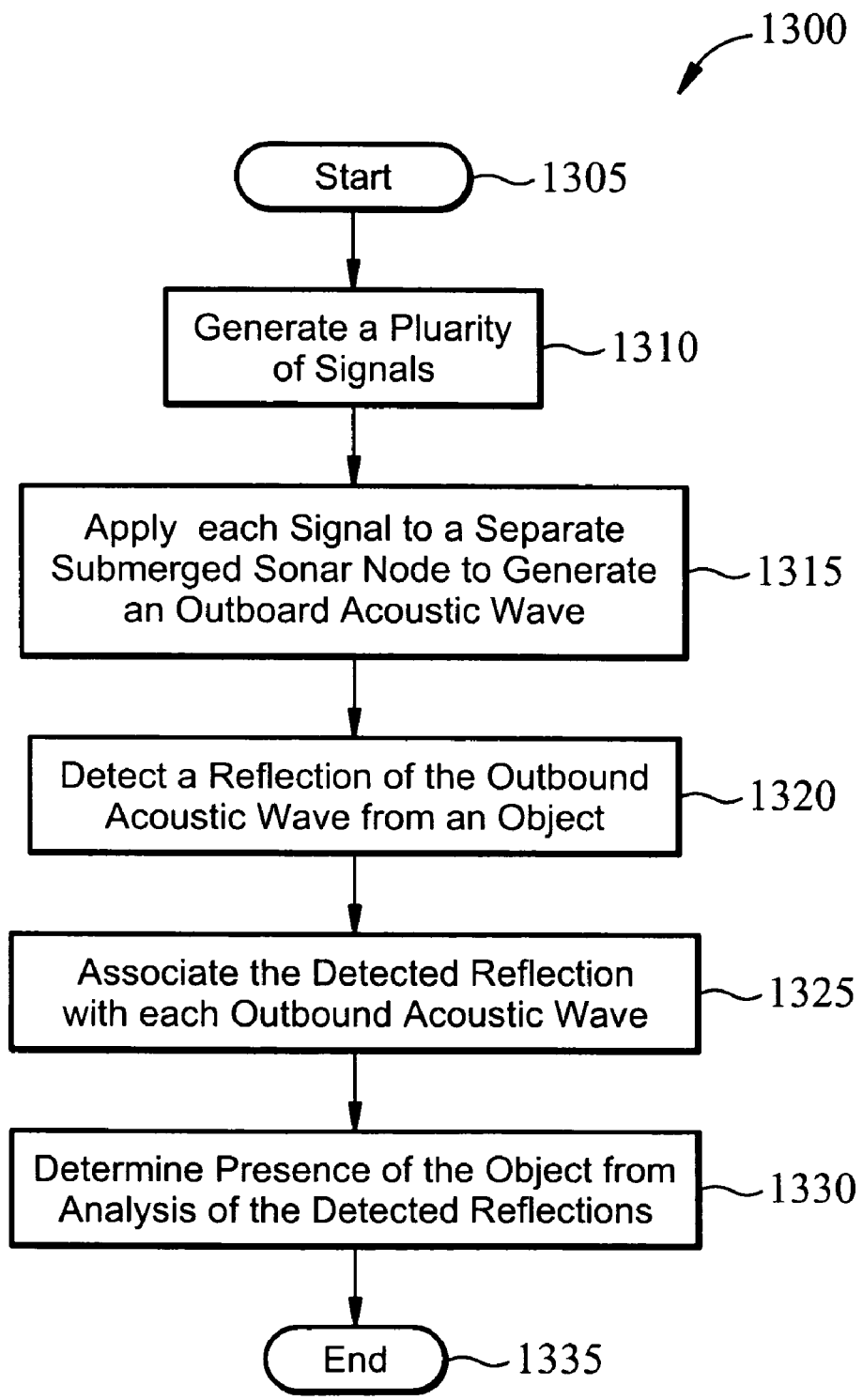
FIG. 13 is a flowchart according to an embodiment of the present invention of a method 1300 for detecting an object in a body of water.

FIG. 13 contains a process flow for one mode of operation 1300 according to the present invention for detecting an object 120 located in a body of water 112. A plurality of applied signals 2005 are generated (Step 1310), and each applied signal 2005 is applied to a separate submerged sonar node 600 of an array 110 of submerged sonar nodes (Step 1315), where each submerged sonar node 600 generates an acoustic wave outbound 130 from the array 110 in response to each applied signal 2005 A reflected acoustic wave 135 from the object 120 of the outbound acoustic wave 130 is detected (Step 1320) and associated (Step 1325) with the generated outbound acoustic wave 130. The presence of an object 120 is determined (Step 1330) from an analysis of the detected reflected acoustic waves 135 associated with each outbound acoustic wave 130. The range of the object 120 is determined by using the speed of sound and the arrival time of the return. The bearing is determined by knowing which dish 600 received the return. A fine-bearing estimation routing can be used to interpolate between two dishes 600 to more precisely determine the bearing.

Figure 14A:
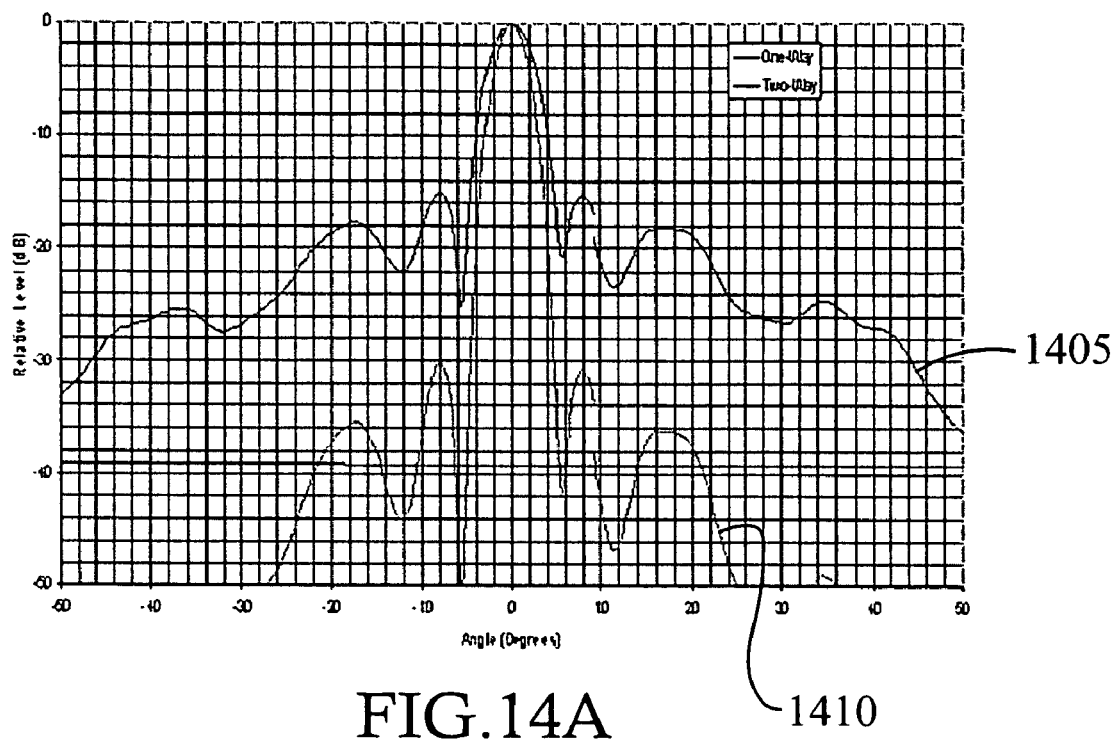
FIG. 14A includes plots for an embodiment of the present invention showing a one way transmission pattern of an outbound acoustic wave and a two way reception pattern of an outbound acoustic wave and a reflected acoustic wave from and to a single dish.
Figure 14B:
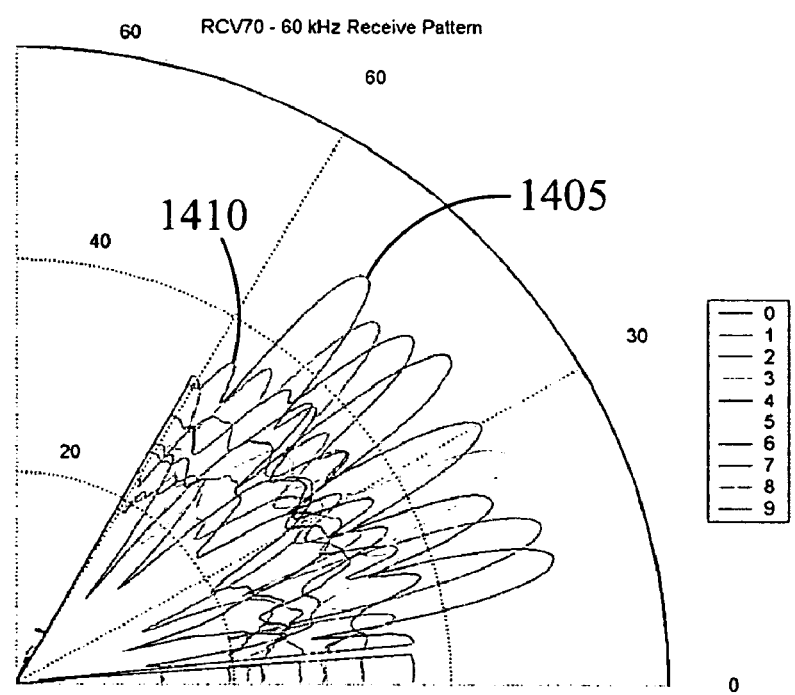
FIG. 14B includes plots for an embodiment of the present invention showing one way transmission patterns of outbound acoustic waves and two way reception patterns of outbound acoustic waves and reflected acoustic waves from and to ten dishes in a node array.

FIG. 14A includes an angular distribution 1405 of the outbound acoustic wave 130, generated by a transducer 615, and an angular distribution 1410 of the reflected acoustic wave 135, associated with the outbound acoustic wave 130 and received by the transmitting transducer 615, where the transmission frequency is 60 kHz according to an embodiment of the present invention. FIG. 14B illustrates the transmission 1405 and reception patterns 1410 for the ten dishes 600 that comprise an array 110 according to an embodiment of the present invention.

Figure 15:
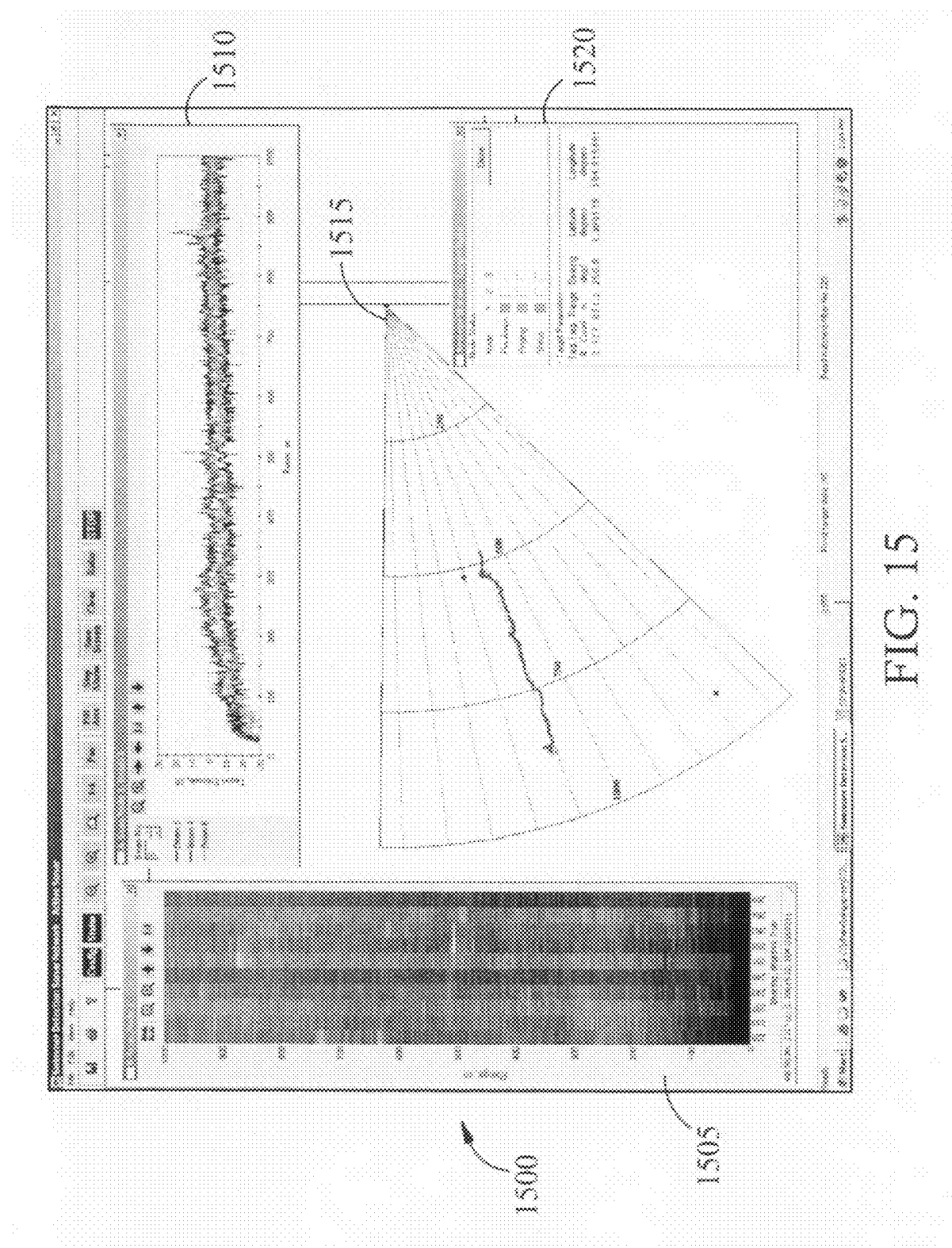
FIG. 15 is a screen shot for an embodiment of the present invention containing interrelated displays associated with the position of an open-air diver swimming out along the bottom.

FIG. 15 contains a screen shot 1500 of an object 120 being tracked by an array 110 of dishes 600 as displayed on the man-machine interface 1110 according to an embodiment of the present invention. In this case, the object 120 is an open-air diver swimming outward from the array 110 along the bottom. Window 1505 portrays the return signals 2010 for each dish 600 of the array 110 as a function of distance from the array 110 in terms of darkness where the stronger return acoustic signals are brighter than the weaker ones. Window 1510 portrays a plot of return signals 2010 for three adjacent dishes 600 as a function of distance from the array 110. Window 1515 portrays the history of the position of an object 120 relative to the position of the array 110. Window 1520 contains the current position of the object 120 in absolute terms, that is, longitude and latitude, and in terms of range and bearing relative to the array 110.

Figure 16:
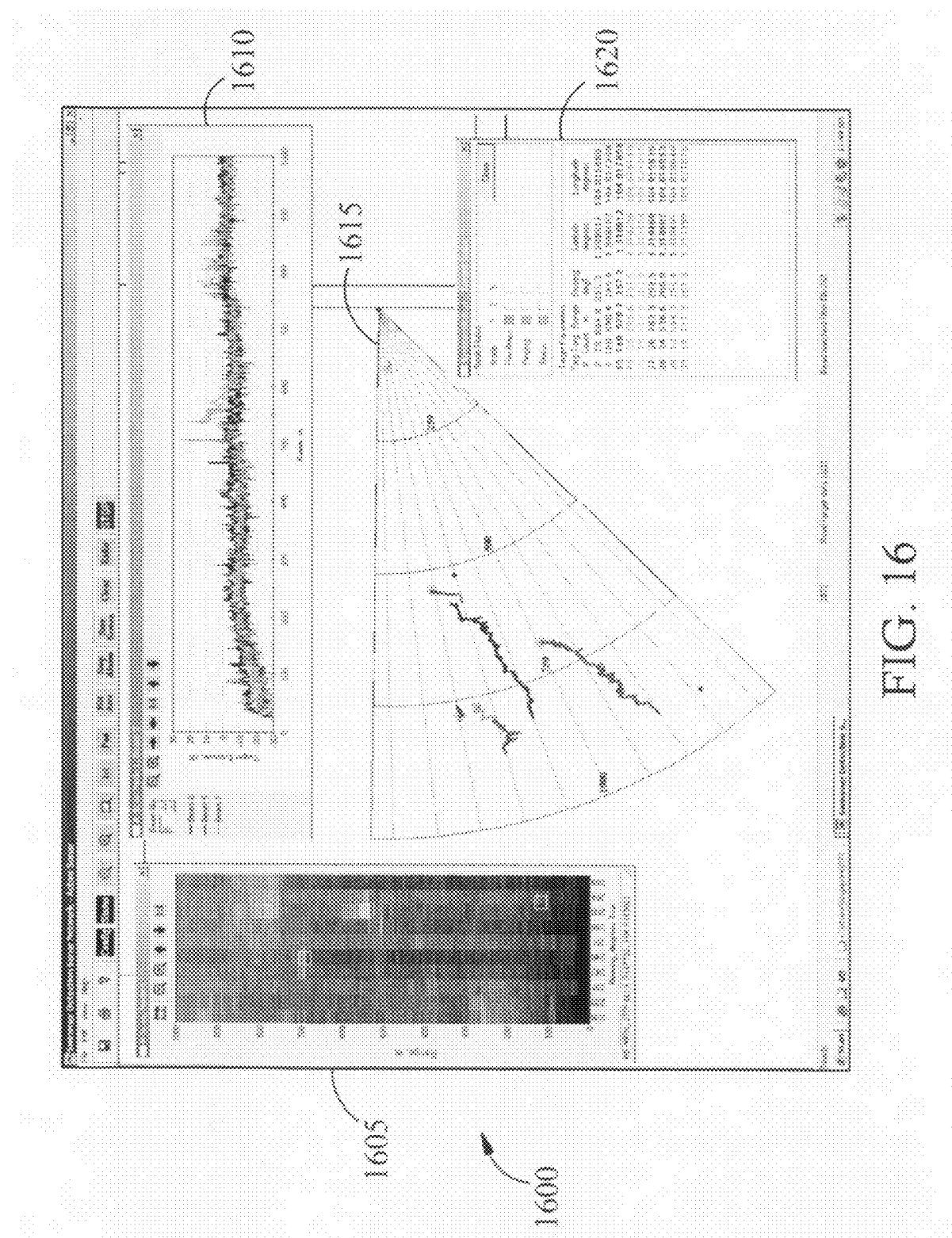
FIG. 16 is a screen shot for an embodiment of the present invention containing interrelated displays associated with the position of three open-air divers swimming in at a depth of substantially 7 meters.

FIG. 16 shows a screen shot 1600 of simultaneous tracking of three objects 120 swimming toward the array 110 according to an embodiment of the present invention. In this case, the objects 120 are open-air swimmers swimming at a depth of 7 meters. The windows 1605, 1610, 1615, and 1620 are similar in form, though not in content, to the windows 1505, 1510, 1515, and 1520 contained in FIG. 15.

Figure 17:
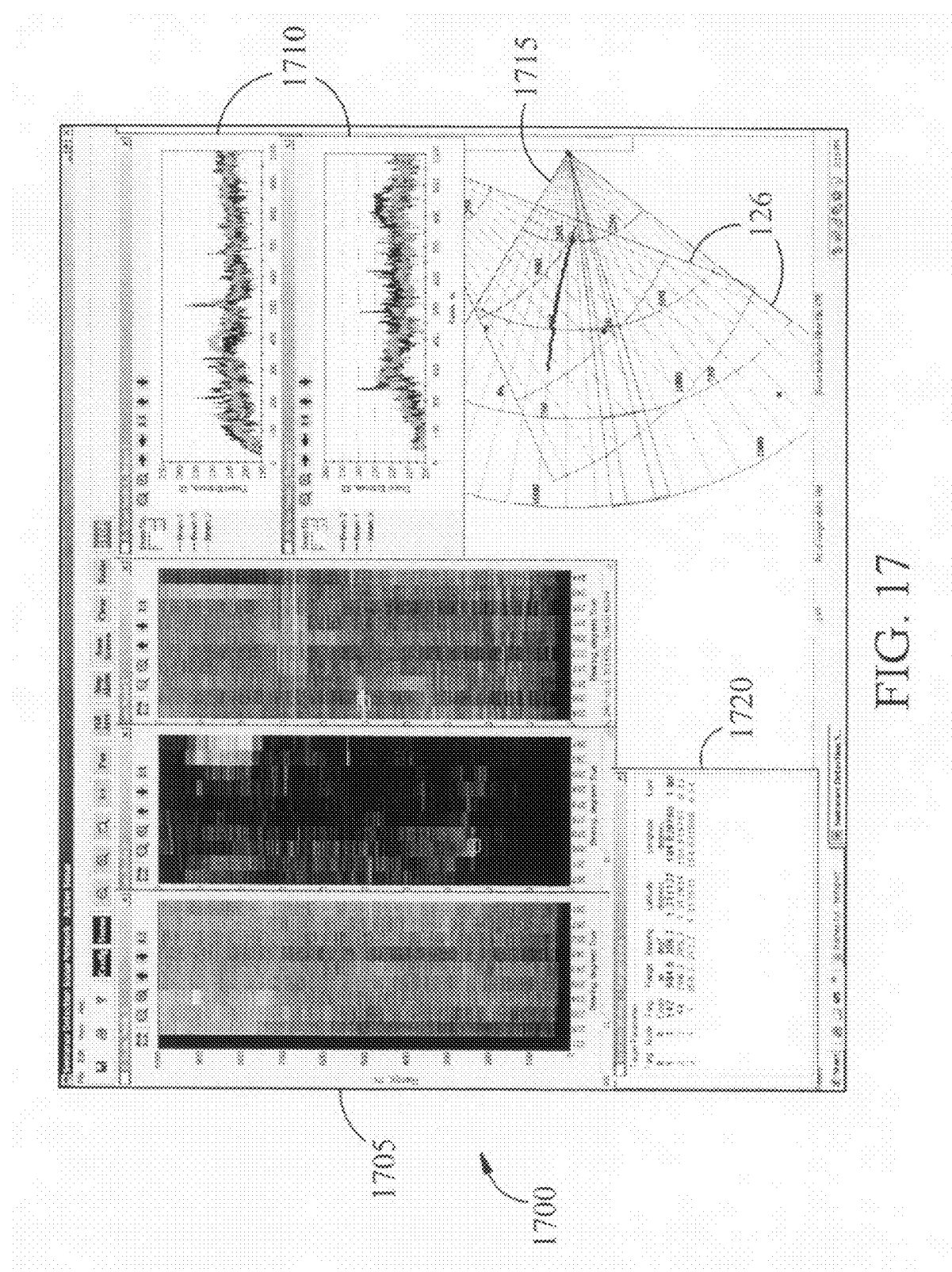
FIG. 17 is a screen shot for an embodiment of the present invention containing interrelated displays associated with the position of a swimmer where the track of a swimmer is the result of fusing of the track results from three nodes.

FIG. 17 shows a screen shot 1700 of the simultaneous tracking of an object 120 by three node arrays 110 where the pattern 126 of one node array 110 overlaps the pattern 126 of the other two node arrays 110 according to an embodiment of the present invention. The windows 1705, 1710, 1715, and 1720 are similar in form, though not in content, to the windows 1505, 1510, 1515, and 1520 contained in FIG. 15. Window 1715 indicates the history of the position of the object 120 relative to the overlapping patterns 126 of the node arrays 110 as an illustration of the result of fusing the observations made by different node arrays 110.

FIG. 18 shows a screen shot 1800 illustrating bistatic mode of operation according to an embodiment of the present invention. In this case, dish #7 600 of node array #1 110 receives reflected acoustic waves 135 whose source was dish #5 600 of node array #2 110. The displays 1805, 1810, and 1815 are similar in form, though not in content, to the displays 1505, 1510, and 1515 contained in FIG. 15.

FIG. 19 further illustrates the capability of an embodiment of the present invention to conduct bistatic target detection, where the horizontal axis reflects distance from a certain node array 110 and the vertical axis reflects time associated with a transmission from the certain node array 110. FIG. 19A shows a track of a target 120 where dish #7 600 of node array #1 110 both transmits the outbound acoustic wave 130 and receives the reflected acoustic wave 135 FIG. 19B shows the track of the target 120 from the perspective of dish #4 600 of node array #2 110, which receives reflected acoustic wave 135 whose origin was the outbound acoustic wave 130 generated by dish #7 600 of node array #1 110 and reflected by the target 120. FIG. 19C shows a track of a target 120 where dish #4 600 of node array #2 110 both transmits the outbound acoustic wave 130 and receives the reflected acoustic wave 135. FIG. 19D shows the track of the target 120 from the perspective of dish #7 600 of node array #1 110, which receives the reflected acoustic wave 135 whose origin were the outbound acoustic wave 130 generated by dish #4 600 of node array #2 110 and reflected by the target 120.

Figure 20B:
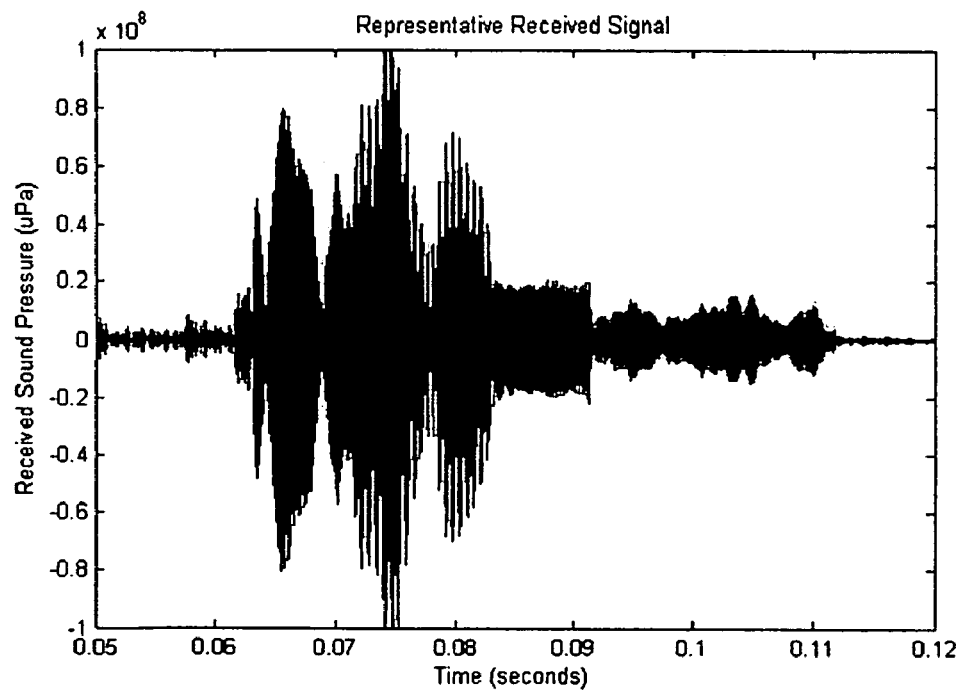
FIG. 20B is a time plot of a representative return electrical signal generated by the transducer in response to reception of the reflected acoustic wave reflected from an object in response to the outbound acoustic wave generated as a result of the applied electrical signal of FIG. 20A according to an embodiment of the present invention.

FIG. 20A shows an example of an applied signal or applied electrical signal 2005 applied to the transducer 615 of the dish 600 according to an embodiment of the present invention. In this example, the applied signal 2005 is approximately 60 KHz. FIG. 20B shows an example, according to an embodiment of the present invention, of a return signal or return electrical signal 2010 generated by the transducer 615 in response to reception of the reflected acoustic wave 135, reflected from an object 120 in response to impingement by the outbound acoustic wave 130 produced in response to the applied signal 2005 of FIG. 20A.

Although the invention has been described with respect to various embodiments, it should be realized that this invention is also capable of a wide variety of further and other embodiments within the spirit and the scope of the appended claims.

What is claimed is:

1. A method of detecting an object located in a body of water, the method comprising:
    generating a plurality of signals;
    applying each signal of said plurality of signals to a separate one of a plurality of submerged sonar nodes, each submerged sonar node generating an individual acoustic wave outbound from the array in a predetermined direction in response to each applied signal;
    detecting a reflection of the outbound acoustic wave from the object;
    associating the detected reflection with each generated outbound acoustic wave; and
    determining the presence of the object by analyzing the detected reflections associated with each outbound acoustic wave.

2. A method of detecting an object located in a body of water, the method comprising:
    generating a plurality of signals;
    applying each individual signal of said plurality of signals to a separate one of a plurality of submerged sonar nodes wherein each of said plurality of sonar nodes is a part of a submerged sonar node array, each submerged sonar node generating an individual acoustic wave outbound from the array in response to each applied signal;
    detecting a reflection of the outbound acoustic wave from the object;
    associating the detected reflection with each generated outbound acoustic wave; and
    determining the presence of the object by analyzing the detected reflections associated with each outbound acoustic wave; and
    wherein at least one of the submerged sonar nodes includes an air-backed surface.

3. The method of claim 2, wherein the at least one of the submerged sonar nodes includes an at least one reflector.

4. The method of claim 3, wherein the at least one reflector comprises the air-backed surface.

5. The method of claim 3, wherein the at least one reflector is a parabolic reflector.

6. The method of claim 5, wherein a transducer is located at the focus of the at least one parabolic reflector.

7. The method of claim 6, wherein the transducer is a hydrophone.

8. The method of claim 1, wherein the plurality of signals are substantially orthogonal.

9. The method of claim 8, wherein frequencies of the plurality of signals occupy the range of substantially 40-75 kHz.

10. The method of claim 8, further including the step of synchronizing the orthogonal signals with a precision timing mark.

11. The method of claim 10, wherein the precision timing mark is a GPS signal.

12. The method of claim 8, further comprising the step of overlapping a transmission pattern of one submerged sonar node with a transmission pattern of another submerged sonar node.

13. The method of claim 8, further including the step of combining transmission patterns generated from the sonar nodes comprising the array occupying a lateral angle of substantially 45 degrees.

14. The method of claim 1, wherein the object is a swimmer.

15. The method of claim 1, wherein the object is a swimmer delivery vehicle.

16. The method of claim 1, wherein the object is an underwater vehicle.

17. The method of claim 1, wherein the object is a non human.

18. A system for detection of an object located in a body of water, the system comprising:
   means for generating a plurality of signals;
   a plurality of submerged sonar nodes forming a submerged sonar node array, each of said plurality of submerged sonar nodes capable of receiving at least one of said plurality of signals, of generating an acoustic wave outbound from said array in a predetermined direction in response to said respective at least one of said signals, and of detecting a reflection of said outbound acoustic wave from the object;
   means for associating said detected reflection with each generated outbound acoustic wave that was source of said reflection; and
   means for determining the presence of the object from said detected reflection.

19. A system for detection of an object located in a body of water, the system comprising:
   means for generating a plurality of signals;
   an array of submerged sonar nodes, each said submerged sonar nodes capable of receiving at least one of said plurality of signals, of generating an acoustic wave outbound from said array in response to said respective at least one of said signals, and of detecting a reflection of said outbound acoustic wave from the object;
   means for associating said detected reflection with each generated outbound acoustic wave that was source of said reflection;
   means for determining the presence of the object from said detected reflection; and
   wherein at least one of the submerged sonar nodes includes an air-backed surface.

20. The system of claim 19, wherein the at least one of the submerged sonar nodes includes an at least one reflector.

21. The system of claim 20, wherein the at least one reflector comprises the air-backed surface.

22. The system of claim 20, wherein the at least one reflector is a parabolic reflector.

23. The system of claim 22, wherein a transducer is located at the focus of the at least one parabolic reflector.

24. The system of claim 23, wherein said transducer is a hydrophone.

25. The system of claim 18, wherein said array is mounted to a land-fixed structure.

26. The system of claim 25, wherein said land-fixed structure is a dock.

27. The system of claim 18, wherein at least one of said submerged sonar nodes has a range of at least substantially 700 meters.

28. The system of claim 18, wherein at least one of said submerged sonar nodes has a range of less than substantially 700 meters.

29. The method of claim 1 wherein at least one of the submerged sonar nodes includes an air-backed surface.

30. The method of claim 29, wherein the at least one of the submerged sonar nodes includes an at least one reflector.

31. The method of claim 30, wherein the at least one reflector comprises the air-backed surface.

32. The method of claim 30, wherein the at least one reflector is a parabolic reflector wherein at least one of the submerged sonar nodes includes an air-backed surface.

33. The method of claim 32, wherein a transducer is located at the focus of the at least one parabolic reflector.

34. The method of claim 33, wherein the transducer is a hydrophone.

35. The system of claim 18, wherein the at least one of the submerged sonar nodes includes an at least one reflector.

36. The system of claim 35, wherein the at least one reflector comprises the air-backed surface.

37. The system of claim 35, wherein the at least one reflector is a parabolic reflector.

38. The system of claim 37, wherein a transducer is located at the focus of the at least one parabolic reflector.

39. The system of claim 38, wherein said transducer is a hydrophone.

* * * * *